United States Patent
Liu et al.

(10) Patent No.: US 12,327,032 B2
(45) Date of Patent: Jun. 10, 2025

(54) DATA PROCESSING METHOD, APPARATUS, DEVICE AND MEDIUM BASED ON DISTRIBUTED STORAGE

(71) Applicant: TENCENT TECHNOLOGY (SHENZHEN) COMPANY LIMITED, Shenzhen (CN)

(72) Inventors: Qucheng Liu, Shenzhen (CN); Maocai Li, Shenzhen (CN); Zongyou Wang, Shenzhen (CN); Hu Lan, Shenzhen (CN); Kaiban Zhou, Shenzhen (CN); Li Kong, Shenzhen (CN); Pan Liu, Shenzhen (CN); Gengliang Zhu, Shenzhen (CN); Yifang Shi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 206 days.

(21) Appl. No.: 17/993,838

(22) Filed: Nov. 23, 2022

(65) Prior Publication Data

US 2023/0098190 A1 Mar. 30, 2023

Related U.S. Application Data

(63) Continuation of application No. PCT/CN2022/074853, filed on Jan. 29, 2022.

(30) Foreign Application Priority Data

Feb. 19, 2021 (CN) .......................... 202110188344.X

(51) Int. Cl.
*G06F 3/06* (2006.01)

(52) U.S. Cl.
CPC ............ *G06F 3/064* (2013.01); *G06F 3/0656* (2013.01); *G06F 3/067* (2013.01); *G06F 3/0604* (2013.01)

(58) Field of Classification Search
CPC ........ G06F 3/064; G06F 3/0656; G06F 3/067; G06F 3/0604
(Continued)

(56) References Cited

U.S. PATENT DOCUMENTS

| | | | |
|---|---|---|---|
| 2019/0108519 A1 | 4/2019 | Asif et al. | |
| 2021/0334275 A1* | 10/2021 | Smart | ................. G06F 16/2456 |
| 2023/0052935 A1 | 2/2023 | Liu | |

FOREIGN PATENT DOCUMENTS

| | | |
|---|---|---|
| CN | 108990002 A | 12/2018 |
| CN | 110457353 A | 11/2019 |

(Continued)

OTHER PUBLICATIONS

The European Patent Office (EPO) The Extended European Search Report for 22755508.3, Feb. 29, 2024 10 Pages.
(Continued)

*Primary Examiner* — Gautam Sain
(74) *Attorney, Agent, or Firm* — ANOVA LAW GROUP, PLLC

(57) ABSTRACT

A data processing method includes: detecting, when writing first block data into a local cache and a local storage, a first block processing space of a storage buffer pool; writing, when a number of block data to be stored does not reach a buffer block processing threshold, the first block data into the storage buffer pool based on N block data to be stored; detecting a second block processing space of a storage processing pool; and determining, when a number of block data to be fed back does not reach a feedback block processing threshold, block data to be merged for overlap
(Continued)

detection with the block data to be fed back in the storage buffer pool based on the number of the block data to be fed back and the feedback block processing threshold, and writing the data retained after overlap detection to a distributed database.

20 Claims, 11 Drawing Sheets

(58) Field of Classification Search
USPC .......................................................... 711/154
See application file for complete search history.

(56) References Cited

FOREIGN PATENT DOCUMENTS

| CN | 110555773 A | 12/2019 |
|----|-------------|---------|
| CN | 110995776 A | 4/2020 |
| CN | 111241061 A | 6/2020 |
| CN | 111444210 A | 7/2020 |
| CN | 111736964 A | 10/2020 |
| CN | 112291372 A | 1/2021 |
| CN | 112559637 A | 3/2021 |
| CN | 113220795 A | 8/2021 |

OTHER PUBLICATIONS

The World Intellectual Property Organization (WIPO) International Search Report for PCT/CN2022/074853 Apr. 13, 2022 7 Pages (including translation).

* cited by examiner

DATA PROCESSING METHOD, APPARATUS, DEVICE AND MEDIUM BASED ON DISTRIBUTED STORAGE

CROSS-REFERENCES TO RELATED APPLICATIONS

This application is a continuation application of PCT Patent Application No. PCT/CN2022/074853, entitled "DATA PROCESSING METHOD AND APPARATUS BASED ON DISTRIBUTED STORAGE, DEVICE, AND MEDIUM" and filed on Jan. 29, 2022, which claims priority to Chinese Patent Application No. 202110188344.X, entitled "DATA PROCESSING METHOD, APPARATUS, DEVICE AND MEDIUM BASED ON DISTRIBUTED STORAGE" and filed with the National Intellectual Property Administration, PRC on Feb. 19, 2021, the entire contents of both of which are incorporated herein by reference.

FIELD OF THE TECHNOLOGY

The present disclosure relates to the field of data storage technologies, and in particular to a data storage technology in a block chain network.

BACKGROUND OF THE DISCLOSURE

At present, in a block chain system, a local storage is generally used as a data storage medium when a consensus node participating in consensus stores data. For example, in the process of a consensus node A performing block consensus on a block N through a consensus layer, an executive layer may be invoked to execute each transaction in this block N. After the block consensus is reached, a transaction execution result of each transaction is sent to a storage layer, such that block information (e.g., a block header, a transaction list and a transaction execution result) of this block N is written into the local storage through the storage layer. In general cases, the local storage and the storage layer in the consensus node are two independent hard disk spaces. Therefore, the data storage performed by using the local storage in the consensus node is limited by a size of the entire hard disk space, resulting in a limited amount of local storage.

In addition, in other block chain systems, a consensus node may also be allowed to use independent databases for data storage. However, for such a block chain system, the storage performance is usually degraded due to the limitation of the block chain structure of the block chain maintained by the block chain system when an independent database is used for data storage. For example, the storage layer can continue to notify the consensus layer to execute the next block after successfully storing a block in the corresponding database, which means that in the process of data storage, data needs to be stored serially according to a generation timestamp of each block, which inevitably reduces the storage efficiency of data in the block chain system.

SUMMARY

Embodiments of the present disclosure provide a data processing method, apparatus, device and medium based on distributed storage, which can improve the data storage efficiency while increasing a data storage capacity.

An embodiment of the present disclosure provides a data processing method based on distributed storage, which is executed by a block chain node and includes: detecting, in response to writing first block data of a first block into a local cache and a local storage, a first block processing space of a storage buffer pool associated with the local cache to obtain a first space detection result, the storage buffer pool including N block data to be stored, where N is a non-negative integer; writing, in response to the first space detection result indicating that a number of block data to be stored in the first block processing space does not reach a buffer block processing threshold of the first block processing space, the first block data into the storage buffer pool based on the N block data to be stored; detecting a second block processing space of a storage processing pool associated with the storage buffer pool to obtain a second space detection result, the storage processing pool being configured to store M block data to be fed back associated with a distributed database, where M is a non-negative integer; and determining, in response to the second space detection result indicating that a number of block data to be fed back in the second block processing space does not reach a feedback block processing threshold of the second block processing space, block data to be merged in the storage buffer pool based on the number of the block data to be fed back and the feedback block processing threshold, performing overlap detection on the block data to be merged and the M block data to be fed back to obtain data retained, and writing the data retained after overlap detection into the distributed database.

An embodiment of the present disclosure provides a data processing apparatus based on distributed storage. The apparatus includes: a first detection module configured to detect, in response to writing first block data of a first block into a local cache and a local storage, a first block processing space of a storage buffer pool associated with the local cache to obtain a first space detection result, the storage buffer pool including N block data to be stored, where N is a non-negative integer; a first writing module configured to write, in response to the first space detection result indicating that a number of block data to be stored in the first block processing space does not reach a buffer block processing threshold of the first block processing space, the first block data into the storage buffer pool based on the N block data to be stored; a second detection module configured to detect a second block processing space of a storage processing pool associated with the storage buffer pool to obtain a second space detection result, the storage processing pool being configured to store M block data to be fed back associated with a distributed database, where M is a non-negative integer; and a second writing module configured to determine, in response to the second space detection result indicating that a number of block data to be fed back in the second block processing space does not reach a feedback block processing threshold of the second block processing space, block data to be merged in the storage buffer pool based on the number of the block data to be fed back and the feedback block processing threshold, performing overlap detection on the block data to be merged and the M block data to be fed back to obtain data retained, and writing the data retained after the overlap detection into the distributed database.

According to an aspect, an embodiment of the present disclosure provides a computer device, including a memory and a processor, the memory being connected to the processor, the memory being configured to store a computer program, and the processor being configured to invoke the computer program to cause the computer device to perform the method provided in this embodiment of the present disclosure.

According to an aspect, an embodiment of the present disclosure provides a non-transitory computer-readable storage medium, storing a computer program, the computer program being applicable to be loaded and executed by a processor, causing a computer device including the processor to perform the method provided in this embodiment of the present disclosure.

According to an aspect, an embodiment of the present disclosure provides a computer program product or a computer program. The computer program product or the computer program includes computer instructions, and the computer instructions are stored in a computer-readable storage medium. A processor of a computer device reads the computer instructions from the computer-readable storage medium and executes the computer instructions to cause the computer device to perform the method provided in this embodiment of the present disclosure.

According to this embodiment of the present disclosure, in the process of using a distributed database for data storage, first block data in a first block (that is, block data of a currently executed block) can be written into a local cache and a local storage (note: the local cache and the local storage here are two storage spaces that are opened up in a storage layer of a block chain node). In this embodiment of the present disclosure, a first block processing space of a storage buffer pool associated with the local cache may be then detected to obtain a first space detection result. The storage buffer pool located in the storage layer includes N block data to be stored at present, where N is a non-negative integer. Further, in response to the first space detection result indicating that a number of block data to be stored in the first block processing space does not reach a buffer block processing threshold (e.g., 10) of the first block processing space, the block chain node may write the first block data into the storage buffer pool based on the N block data to be stored. Further, the block chain node may detect a second block processing space of a storage processing pool associated with the storage buffer pool to obtain a second space detection result, the storage processing pool being configured to store M block data to be fed back associated with a distributed database, where M is a non-negative integer. In response to the second space detection result indicating that a number of block data to be fed back in the second block processing space does not reach a feedback block processing threshold of the second block processing space, the block chain node may determine block data to be merged in the storage buffer pool based on the number of the block data to be fed back and the feedback block processing threshold, perform overlap detection on the block data to be merged and the M block data to be fed back, and write the data retained after overlap detection into the distributed database. It can be seen that, in the process of data storage in this embodiment of the present disclosure, the local storage is replaced with the distributed database in order to increase the data storage capacity. In addition, in order to improve the efficiency of reading and writing data in the process of using the distributed database for data storage, the storage layer is further expanded in this embodiment of the application. That is, the local cache, the local storage, the storage buffer pool, the storage processing pool and the like are expanded in the storage layer and reconstructed to obtain a new storage layer. In this way, the process of using this storage layer to obtain the data stored in the distributed database can not only realize parallel storage of a plurality of blocks, but also break through the limitation of a block chain structure maintained by the entire block chain system from the root. In other words, the block chain node in this embodiment of the present disclosure can improve the data storage capacity and the data storage efficiency in the process of storing a plurality of blocks in parallel in the distributed database.

DESCRIPTION OF EMBODIMENTS

The technical solutions in the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
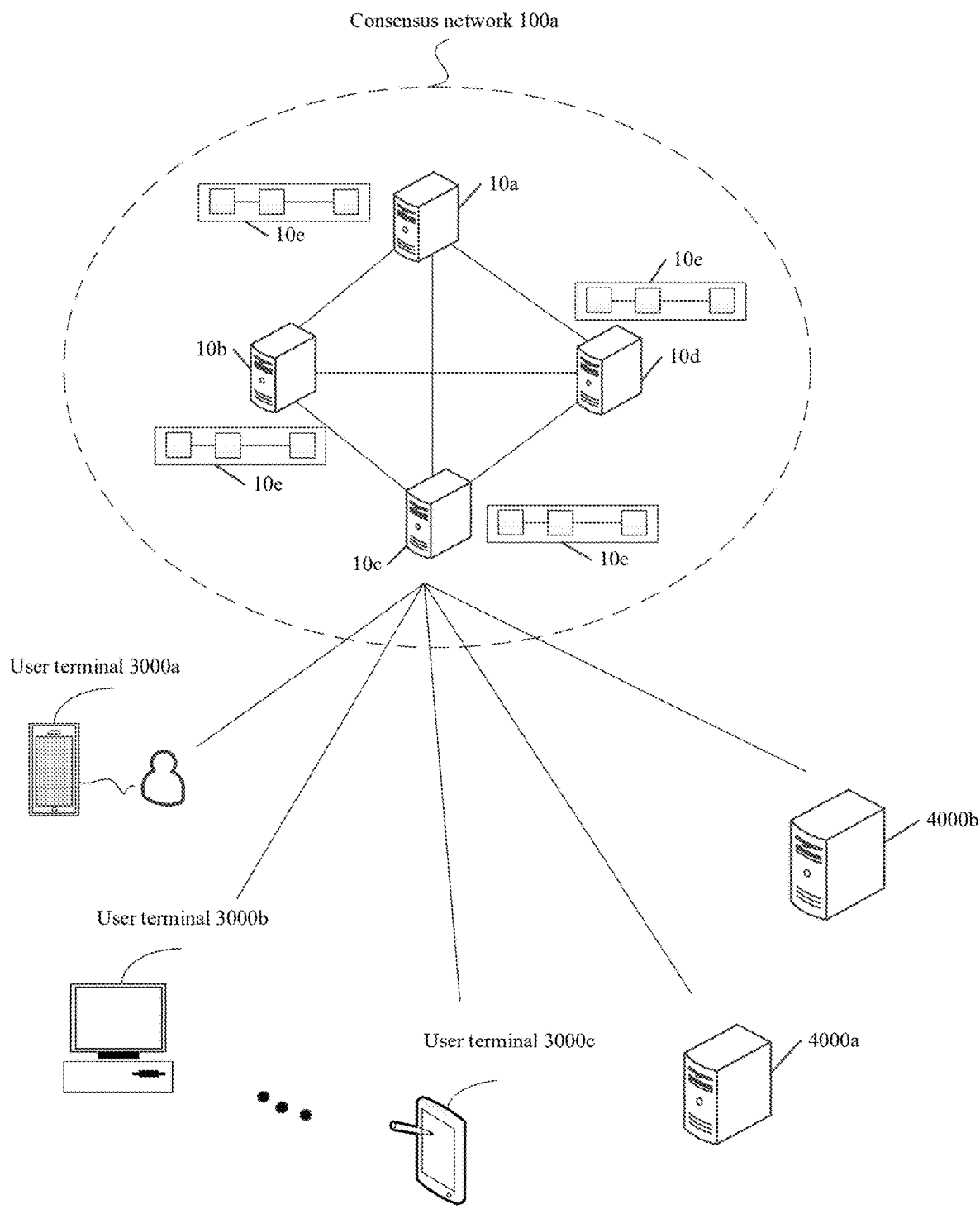
FIG. 1 is a schematic diagram of a network architecture provided by an embodiment of the present disclosure.

FIG. 1 is a schematic diagram of a network architecture provided by an embodiment of the present disclosure. The network architecture shown in FIG. 1 may be applied to a block chain system. The block chain system may be a distributed system formed by a plurality of nodes connected by means of network communication. The block chain system may include, but is not limited to, a block chain system corresponding to an alliance chain.

The block chain is a new application mode of computer technologies such as distributed data storage, point-to-point transmission, a consensus mechanism, and an encryption algorithm, which is mainly configured to organize data in chronological order and encrypt it into a ledger, thereby preventing the data from being tampered and forged while verifying, storing and updating data. The block chain is essentially a decentralized database. Each node in the database stores an identical block chain, and a block chain network divides the nodes into core nodes and light nodes, where the core nodes may be responsible for the consensus of the entire block chain network, that is, the core nodes may be consensus nodes in the block chain network. The process of writing transaction data into a ledger (e.g., a local ledger) in the block chain network may be as follows: a client sends the transaction data to the light nodes, and then the transaction data is passed between the light nodes in the block chain network in a baton form until the consensus node receives the transaction data; the consensus node then packs the transaction data into the blocks, in order to reach consensus with other consensus nodes in the future; and after the consensus is passed, a plurality of blocks carrying the transaction data may be written into the distributed database in parallel through the storage layer, which can break through the limitations of the block chain structure of the block chain from the root, thereby effectively improving the storage efficiency of data storage.

The block chain system may include a smart contract. In the block chain system, the smart contract may be understood as a code executed by each node (including the consensus node) of the block chain, and any logic may be executed through the smart contract to obtain a result. For example, a user can initiate a transaction service request through the client to call the smart contract that has been deployed on the block chain. Subsequently, the data node or light node on the block chain may transmit the transaction service request to each consensus node to call the smart contract running in each consensus node to execute a transaction service requested by the user. It is to be understood that the block chain may include one or more smart contracts, and these smart contracts may be distinguished by a contract calling address, a contract identify document (ID) or a contract name. However, in the transaction service request initiated by the client, the contract calling address or contract identify document or contract name of the smart contract may be carried to specify the smart contract that needs to be run. If the smart contract specified by the client is a contract that needs to read data (that is, a service contract), each consensus node may read data by accessing the local cache created in the storage layer. At last, each consensus node will verify each other whether transaction execution results are consistent (that is, whether a consensus is reached), and if so, the transaction execution results may be stored in the respective local caches and local storages, and returned to the client. The local cache here is a system memory created in the storage layer; and the local storage here is a hard disk space created in the storage layer for data storage. In this way, it will not be impossible to read data because the data in the system memory disappears when a consensus node is down or the system fails. That is, the consensus node can read data through the local storage created in the storage layer.

It is to be understood that the network architecture shown in FIG. 1 may include a core node (i.e., consensus node) cluster, a light node cluster, and a user terminal cluster. The core node cluster may include a plurality of core nodes, and the plurality of core nodes here may specifically include a node 10a, a node 10b, a node 10c, and a node 10d shown in FIG. 1. As shown in FIG. 1, the node 10a, the node 10b, the node 10c and the node 10d may be connected through a network to form a consensus network 100a shown in FIG. 1. It can be understood that, in the consensus network 100a, the node 10a, the node 10b, the node 10c and the node 10d can all perform data interaction through network connection. In addition, the user terminal cluster may include a plurality of user terminals, and the plurality of user terminals here may specifically include a user terminal 3000a, a user terminal 3000b, . . . , and a user terminal 3000c shown in FIG. 1. As shown in FIG. 1, the user terminal 3000a, the user terminal 3000b, . . . , and the user terminal 3000c may respectively perform network connection with the node 10c, so as to perform data interaction through the network connection with the node 10c. In addition, the light node cluster may include a plurality of light nodes, and the plurality of light nodes here may specifically include a server 4000a and a server 4000b shown in FIG. 1. As shown in FIG. 1, the server 4000a and the server 4000b may be connected to the node 10c via a network, respectively, so as to perform data interaction through the network connection with the node 10c.

In this embodiment of the present disclosure, each core node (e.g., the node 10a, the node 10b, the node 10c, and the node 10d) in the consensus network 100a may be collectively referred to as a block chain node. It is to be understood that these block chain nodes may be configured to maintain the same block chain (e.g., a block chain 10e shown in FIG. 1). A peer-to-peer (P2P) network can be formed between any two block chain nodes in the consensus network 100a. The peer-to-peer network may use a P2P protocol, which is an application layer protocol running over a transmission control protocol (TCP). In a distributed system, any device such as server or a terminal can join the block chain network and become a block chain node. Each block chain node may include a hardware layer, an intermediate layer, an operating system layer and an application layer.

In this embodiment of the present disclosure, a block chain node may be bound to any role (e.g., any individual user, any enterprise, any institution and other entity objects) accessing the block chain network, and the block chain network formed by these block chain nodes may be collectively referred to as an alliance chain network. Therefore, there is a one-to-one correspondence between the nodes 10a, 10b, 10c, and 10d shown in FIG. 1 and the corresponding role (i.e., an entity object in the corresponding service scenario) that needs to be connected to the alliance chain network. The service scenario here may include an electronic bill scenario, a social scenario, a credit purchase scenario, a credit scenario, or the like. At this time, a target service under the corresponding service scenario may specifically include an electronic bill service, a social network service, a credit purchase service, a credit service, etc., and the specific services under the corresponding service scenarios are not listed one by one here.

Since each entity object may correspond to one block chain node, the enterprise user (that is, the above-mentioned enterprise) may be used as the entity object in this embodiment of the application. At this time, the block chain node associated with each enterprise user may be the same block chain node (for example, the above-mentioned node 10c shown in FIG. 1 may perform data interaction with respective user terminals corresponding to a plurality of enterprise users). For example, in an electronic bill system of the block chain, an electronic bill service (such as a registration service, a billing service, or a bill transfer service) corresponding to each billing enterprise may be collectively referred to as a transaction service. A billing enterprise A may perform data interaction with the node 10c shown in FIG. 1 through the user terminal 3000a shown in FIG. 1 to complete a corresponding transaction; by analogy, a billing enterprise B may perform data interaction with the node 10c shown in FIG. 1 through the user terminal 3000b shown in FIG. 1 to complete a corresponding transaction; and a billing enterprise C may perform data interaction with the node 10c shown in FIG. 1 through the user terminal 3000c shown in FIG. 1 to complete a corresponding transaction.

In this embodiment of the present disclosure, the above entity objects (e.g., the billing enterprise A, the billing enterprise B and the billing enterprise C) that transmit transaction service requests for electronic bill service may be collectively referred to as target users; the block chain nodes that receive transaction service requests sent by the target users may be collectively referred to as light nodes; and the block chain nodes participating in the consensus on the transaction service request may be collectively referred to as core nodes.

In some embodiments, in the consensus network 100a, since the node 10c can synchronize data with other block chain nodes that have network connections (also referred to as session connections), that is, the node 10c can synchronize corresponding service data information from other block chain nodes (for example, can synchronize transaction service requests sent by other enterprise users from other block chain nodes), the core nodes associated with each enterprise user can be different block chain nodes. For example, the billing enterprise A may perform data interaction with the node 10c shown in FIG. 1 through the user terminal 3000a shown in FIG. 1. The billing enterprise B may perform data interaction with the node 10b shown in FIG. 1 through the user terminal 3000b shown in FIG. 1. The billing enterprise C may perform data interaction with the node 10a shown in FIG. 1 through the user terminal 3000c shown in FIG. 1. These nodes in the block chain network will maintain the same block chain, so a network load in the block chain network can be effectively balanced by randomly allocating the transaction service requests sent by different user terminals to the block chain nodes associated with the block chain 10e, thereby improving the processing efficiency of the service data corresponding to the corresponding service.

In another example, in a crediting system, the credit service requested by the target user (for example, a user corresponding to the user terminal 3000a) may be understood as another transaction service. The target user can perform data interaction with the node 10c shown in FIG. 1 through the user terminal 3000a shown in FIG. 1 in order to transmit a transaction service request for the corresponding service to the node 10c shown in FIG. 1. That is, in the crediting system, one block chain node may be configured for each user accessing the crediting system in order to receive a transaction service request sent by the corresponding user. It is to be understood that each user in this embodiment of the present disclosure may also be collectively referred to as an entity object, for example, the entity object requesting the aforementioned credit service may be the aforementioned individual user, enterprise user, or the like.

The light node, in response to receiving the transaction service request, may forward the transaction service request initiated by the target user to the core node, so as to verify, through the core node, the legality of the transaction service request initiated by the target user. The core node may add the transaction service requested by the first user to a transaction pool in response to the transaction service request passing the legality verification, so that transaction data associated with the transaction service request can be subsequently packed into a block. Therefore, the consensus nodes in the consensus network 100a perform block consensus, and write, after the block consensus is passed, block data of the block into the local cache and the local storage, thereby facilitating subsequent parallel storage of block data of a plurality of blocks based on the above distributed storage.

Figure 2:
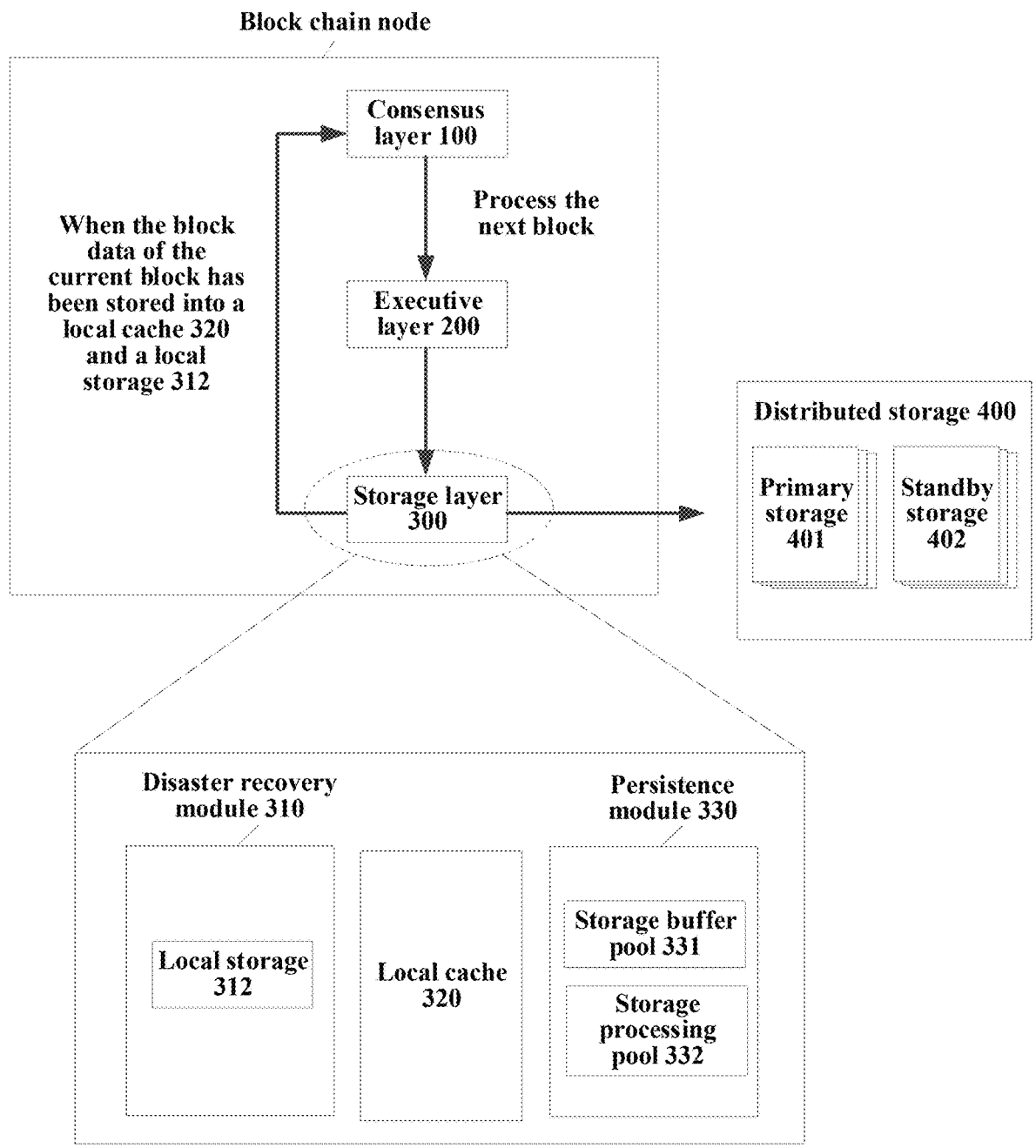
FIG. 2 is a schematic diagram of a scenario of data storage based on distributed storage provided by an embodiment of the present disclosure.

For ease of understanding, further, FIG. 2 is a schematic diagram of a scenario of data storage based on distributed storage provided by an embodiment of the present disclosure. A block chain node shown in FIG. 2 may be any one of the core nodes in the embodiment corresponding to FIG. 1. The block chain node can implement parallel storage of a plurality of blocks (referred to as a plurality of blocks) through a consensus layer 100, an executive layer 200, a storage layer 300 and a distributed storage 400.

The main functions of the consensus layer 100 may include a block packing function, a block broadcasting function and a block consensus function. It is to be understood that in the process of performing block consensus through the block consensus function, the consensus layer 100 can call the executive layer 200 shown in FIG. 2 to execute respective transaction services in the blocks, so as to perform transaction verification on respective transaction services in a block to be reached a consensus currently, and further determine to reach a block consensus of the block 1 when the transaction verification is successful. At this time, as shown in FIG. 2, the block chain node may collectively refer to a transaction execution result of each transaction service executed by the executive layer 200 as block data of the block 1, and then may transmit the block data of the block 1 to the storage layer shown in FIG. 2.

In this embodiment of the present disclosure, blocks N currently received by the executive layer 200 and transmitted by the consensus layer 100 may be collectively referred to as first blocks, and block data of the first blocks that have been executed by the executive layer 200 may be collectively referred to as first block data of the first block. It is to be understood that the first block data in the first block may include, but is not limited to, the transaction execution result of each transaction service in the first block. For example, the first block data in the first block may also include block header information (i.e., first block header information) of the first block. In some embodiments, the number of transaction services in the first block may be K1. At this time, the first block data in the first block may further include a transaction list associated with the K1 transaction services, where K1 may be a positive integer.

Figure 3:
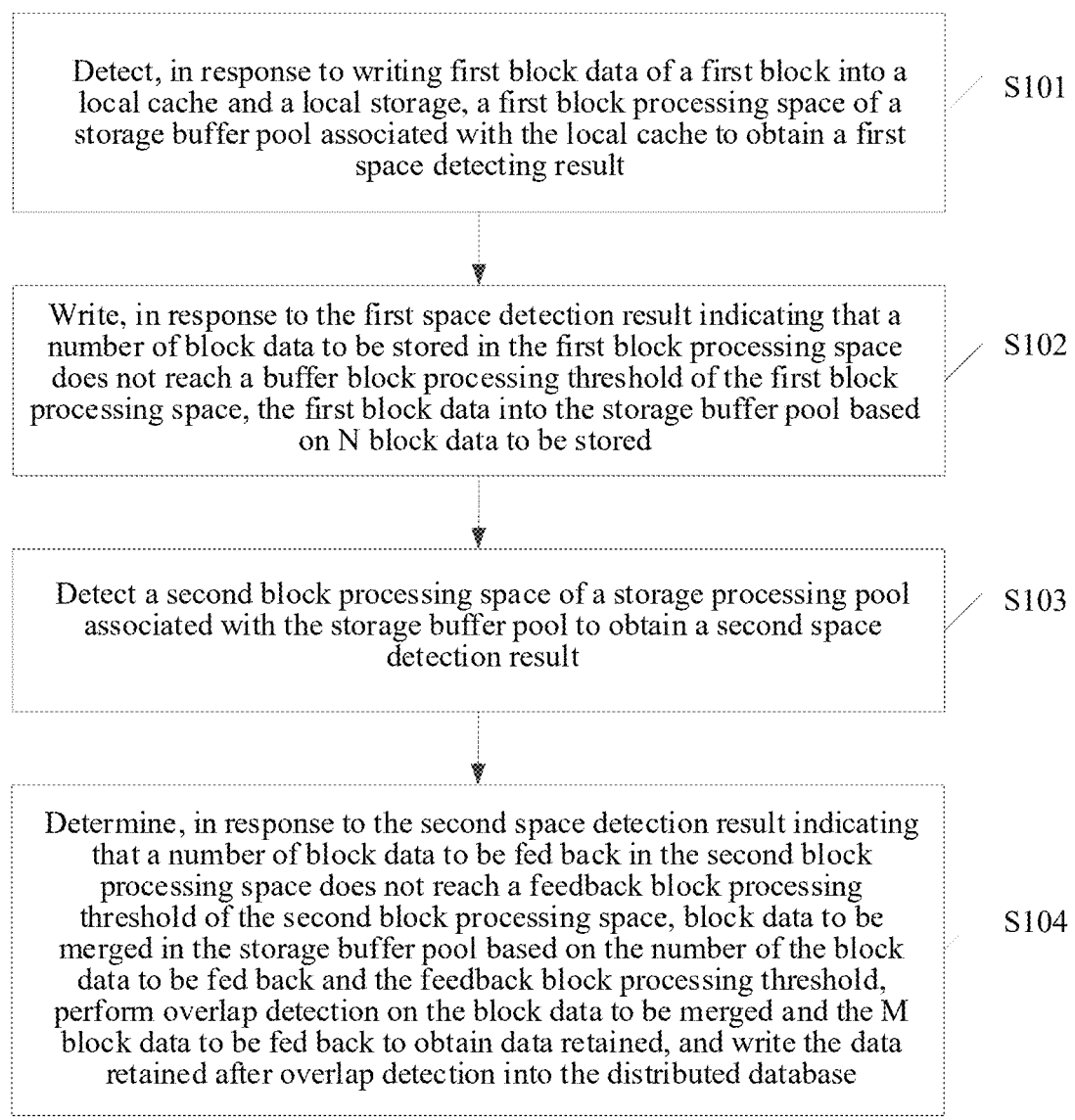
FIG. 3 is a schematic flowchart of a data processing method based on distributed storage provided by the present disclosure.

In response to executing a certain transaction in the block, the executive layer 200 may call a smart contract in a contract virtual machine (referred to as a virtual machine) to execute a corresponding transaction service, and may transmit each transaction execution result to the storage layer 300 shown in FIG. 3 when the execution of each transaction in the block is completed.

The storage layer 300 may be responsible for storing block information (e.g., a block header, a transaction list, an execution result and other block data) of the first block into the distributed storage 400 shown in FIG. 2. The distributed storage 400, as a data storage medium, may be integrated on other distributed servers independently of the block chain node. As shown in FIG. 2, the storage layer 300 may include a disaster recovery module 310, a local cache 320 and a persistence module 330 shown in FIG. 2. The local cache 320 here may be a local cache module created in the block chain node. The local cache 320 may be a system memory of the block chain node.

As shown in FIG. 2, the disaster recovery module 310 may be located in a storage hard disk of the block chain node. The local storage 312 shown in FIG. 2 may be configured to store (i.e., back up) the same block data as the local cache 320. In this way, when the block chain node is down or the system fails, the execution of other transaction service in the block will not be affected by the disappearance of block data cached in the system memory. At this time, the block chain node may use the disaster recovery module 310 to read target data required to execute other transaction service in the block from the storage hard disk of this node. The local storage 312 may be a local storage unit with a persistence capability in the disaster recovery module 310.

As shown in FIG. 2, the block chain node may notify the consensus layer 100 shown in FIG. 2 to process the next block of the first block in response to writing the first block data of the first block to the local storage 312 and the local cache 320 shown in FIG. 2. It can be understood that, in this embodiment of the present disclosure, the next block of the first block may be collectively referred to as a new first block. In order to facilitate the distinction between differences processed by the consensus layer 100 at different times, in this embodiment of the present disclosure, a block (i.e., the aforementioned new first block) processed at the next time from the current time may be referred to as a second block, and block data of the second block may be collectively referred to as second block data.

As shown in FIG. 2, the persistence module 330 in the storage layer 300 may include a storage buffer pool 331 and a storage processing pool 332 shown in FIG. 2. The storage buffer pool 331 may be configured to store the first block data of the executed first block sent by the executive layer 200. The first block of data may be merged with data (e.g., N block data to be stored) currently stored in the storage buffer pool 331, thereby reducing the waste of a storage space of the storage buffer pool 331 caused by repeated storage of the same data. The size of a block processing space (i.e., a first block processing space) of the storage buffer pool 331 may be adaptively configured according to actual service requirements.

In addition, in this embodiment of the present disclosure, in response to writing the first block data of the first block into the local cache 320 and the local storage 312, the block chain node may also detect the first block processing space of the storage buffer pool through a first refreshing thread, and allow the first block data to be written into the storage buffer pool 331 based on the aforementioned N block data to be stored when it is determined according to a space detection result (i.e., a first space detection result) that the storage buffer pool 331 has a space for processing the block data of the current block. It is to be understood that, by configuring the space size of the storage buffer pool 331, the problem of data read errors caused by too fast block execution can be fundamentally solved. For example, when the block is executed too fast due to improper configuration of the space size, the block chain node will clear data in the local cache 320 that has not been stored in the distributed database 400 (e.g., some data that has been stored for a long time), resulting in data read errors. Therefore, the block chain node may perform buffer refreshing on the first block processing space of the storage buffer pool 331 through the first refreshing thread after writing the first block data into the storage buffer pool 331. In this way, when the refreshed first block processing space has space for processing the above-mentioned next block, the block chain node may allow further reception of the second block data of the executed second block transmitted by the executive layer 200.

Further, the data in the storage buffer pool 331 may be collectively referred to as data to be stored after the block chain node writes the first block data into the storage buffer pool 331. In this way, when it is determined according to a space detection result (i.e., a second space detection result) that the storage processing pool 332 has space to store data after the block chain node detects a block processing space (i.e., a second block processing space) of the storage processing pool 332 shown in FIG. 2 through a second refreshing thread, a corresponding amount of block data (e.g., one or more block data) is allowed to be acquired from the storage buffer pool 331 as block data to be merged, and then the acquired block data to be merged and the M block data to be fed back in the storage processing pool 332 are subjected to overlap detection, thereby writing the data subjected to overlap detection into the distributed database of the distributed storage 400 shown in FIG. 2. By configuring the space size of the storage processing pool 332, parallel storage of a plurality of blocks can be implemented without excessive memory consumption.

A specific process of the block chain node writing the first block data into the storage buffer pool and storing a plurality of blocks in parallel may refer to the embodiments corresponding to FIGS. 3 to 9 below.

Further, FIG. 3 is a schematic flowchart of a data processing method based on distributed storage provided by the present disclosure. As shown in FIG. 3, the method can be executed by the block chain node in the above-mentioned block chain network. For example, the block chain node may be any core node in the consensus network 100a shown in FIG. 1. The method may specifically include the following steps S101-S104.

S101: Detect, in response to writing first block data of a first block into a local cache and a local storage, a first block processing space of a storage buffer pool associated with the local cache to obtain a first space detection result.

The storage buffer pool includes N block data to be stored, where N is a non-negative integer and is configured to represent the number of blocks to be stored in the first block processing space.

The block chain node may acquire K1 transaction services in the first block in response to receiving a first block transmitted by a consensus layer (e.g., the consensus layer 100 shown in FIG. 2), and then call a service contract of each transaction service to execute a corresponding transaction service. The first block may be a block packed at the current time (such as time T1) based on a block packing function of the consensus layer, and the block packed at the time T1 may be the above-mentioned block 1.

The block chain node may, after executing the block 1 (i.e., the first block) through an executive layer (e.g., the executive layer 200 shown in FIG. 2), write the first block data of the block 1 into a local cache (e.g., the local cache 320 shown in FIG. 2) and a local storage (e.g., the local storage 312 shown in FIG. 2). The block chain node may immediately notify the consensus layer to process the next block after writing the first block data into the local cache and the local storage. Furthermore, the consensus layer may further acquire K2 transaction services from a transaction pool for packing based on the block packing function, so as to generate a new block (i.e., the block 2) to be reached consensus. In this embodiment of the present disclosure, blocks packed by the consensus layer at time T2 may be collectively referred to as a second block. The number of transaction services in the second block (i.e., K2) and the number of transaction services (i.e., K1) in the first block may be the same or different. The specific values of K1 and K2 will not be limited here. The time T1 and the time T2 are two different packing times, and the time T2 follows the time T1.

Figure 4:
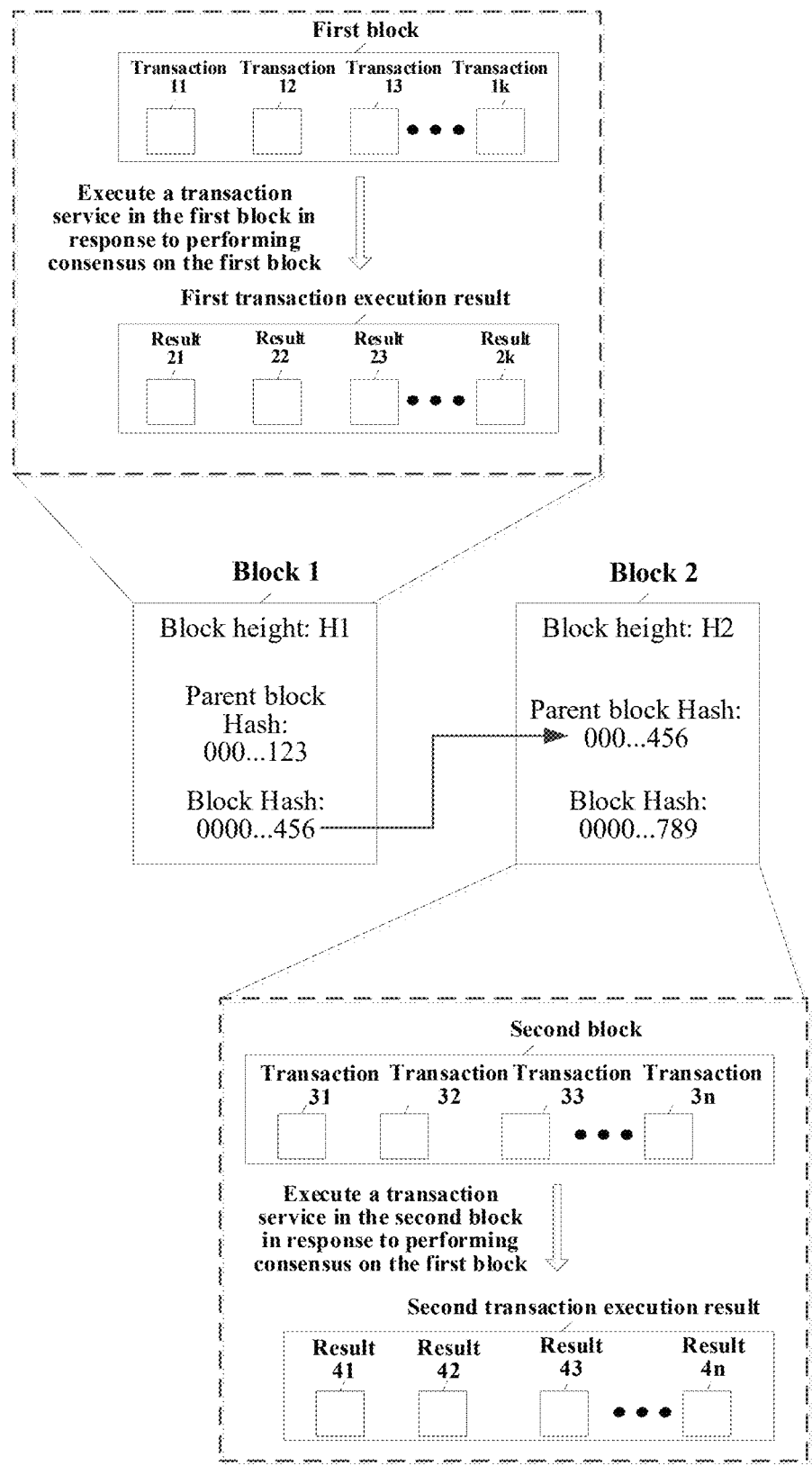
FIG. 4 is a schematic diagram of a scenario in which a first block and a second block are executed provided by an embodiment of the present disclosure.

For ease of understanding, further, FIG. 4 is a schematic diagram of a scenario in which the first block and the second block are executed provided by an embodiment of the present disclosure. The first block shown in FIG. 4 may be the block 1 to be verified that is packed by the consensus layer at time T1, and the block 1 to be verified may include K1 transaction services, specifically including a transaction 11, a transaction 12, a transaction 13, . . . , a transaction 1k shown in FIG. 4. It is to be understood that an executive layer H of the block chain node may, in response to acquiring the K1 transaction services, perform transaction verification on each of the K1 transaction service, and after the transaction verification is successful, obtain a transaction execution result of each transaction service. As shown in FIG. 4, the transaction execution result of each transaction service in the block 1 may be a first transaction execution result shown in FIG. 4. In the first transaction execution result, a result 21 may be a transaction execution result corresponding to the transaction 11, the result 22 may be a transaction execution result corresponding to the transaction 12, the result 23 may be a transaction execution result corresponding to the transaction 13, and by analogy, the result 2k may be a transaction execution result corresponding to the transaction 1k.

The block chain node may, after completing the transaction verification, generate verification success indication information. The consensus layer of the block chain node may, in response to receiving the verification success indication information transmitted by more than half of the other consensus nodes, may determine that a block consensus on the first block has been reached, such that the first block data of the first block that has reached consensus (i.e., the block 1 shown in FIG. 4) can be written to the local cache and local storage. The block chain node may, in response to writing the first block data of the first block into the local cache and the local storage, asynchronously detect a block processing space (i.e., the first block processing space) of a storage buffer pool (e.g., the storage buffer pool 331 shown in FIG. 2) through the first refreshing thread, thereby obtaining a first space detection result. The first space detection result may be configured to represent whether the storage buffer pool has space to process the current block at the current time (e.g., time T1', where the time T1' may be the time after the above-mentioned time T1, such as the above-mentioned time T2).

When the block chain node counts through the first refreshing thread that the number of block data to be stored currently stored in the storage buffer pool is N, it means that the number of blocks to be stored that can be buffered by the first block processing space of the storage buffer pool (i.e., the number of blocks to be stored) is N. For example, in response to the first space detection result indicating that the number of block data to be stored in the first block processing space (e.g., N=6) does not reach a buffer block processing threshold of the first block processing space (e.g., $N_{max}$=10), it is indicated that the storage buffer pool has space for processing the current block at the current time (e.g., the above-mentioned T1' time), and then the following step S102 can be further performed.

In some embodiments, in response to the first space detection result indicating that the number of block data to be stored in the first block processing space (e.g., N=10) has reached the buffer block processing threshold (e.g., $N_{max}$=10), the executive layer may be notified to wait for the first block of data to be stored, which means that the storage buffer pool has no space to process the current block at this time. Therefore, the executive layer needs to wait until the storage buffer pool has space to process the current block, and then the following step S102 can be further performed.

S102: Write, in response to the first space detection result indicating that the number of block data to be stored in the first block processing space does not reach the buffer block processing threshold of the first block processing space, the first block data into the storage buffer pool based on the N block data to be stored.

Specifically, in response to the first space detection result indicating that the number of block data to be stored in the first block processing space does not reach the buffer block processing threshold of the first block processing space, the block chain node may acquire N block data to be stored from the storage buffer pool, and then search for the block data to be stored that overlaps with the first block data from the N block data to be stored; in response to finding the block data to be stored that overlaps with the first block data from the N block data to be stored, the block chain node may use the found block data to be stored as overlapped block data; and further, the block chain node may replace the overlapped block data with the first block data, use the replaced N block data to be stored as first merged data associated with the first block data, and write the first merged data into the storage buffer pool.

In the process of writing the first block data into the storage buffer pool, the block chain node needs to merge N block data to be store that is currently stored in the storage buffer pool, so that the repeated storage of the same data can be reduced.

For example, in the process of writing the first block data into the storage buffer pool, when the system fails before the block chain node fails to write the block data of the entire block into the storage buffer pool, the storage buffer pool will store part of the block data of the first block. In this way, after the block chain node restarts, it can re-receive the block 1 (i.e., the first block) transmitted by the executive layer. At this time, the block chain node may read target data for executing the K1 transaction services in the block 1 from the local storage of the storage layer, and then obtain transaction execution results of the K1 transaction services. In response to writing the regenerated first block data into the storage buffer pool, the block data to be stored that overlaps with the first block data may be found in the current N block data to be stored. Further, the block chain node may use the found block data to be stored (i.e., the part of block data of the first block) as overlapped block data, and replace the overlapped block data with the first block data in the N block data to be stored, such that the replaced N block data to be stored may be used as first merged data, and the first merged data may be written into the storage buffer pool. It can thus be seen that, in the event of a downtime or a system failure, the block chain node may further replace part of block data of the first block buffered during the system failure or downtime with the regenerated first block data in the N block data to be stored, thereby avoiding repeated writing of the same data.

In some embodiments, in response to not finding the block data to be stored that overlaps with the first block data from the N block data to be stored, the block chain node may use the first block data and the N block data to be stored as second merged data associated with the first block data, write the second merged data into the storage buffer pool, and perform incremental processing on the number of block data to be stored in the first block processing space, where the number of block data to be stored in the first block processing space after incremental processing is N+1.

In some embodiments, the block chain node may also further receive block data of the next block transmitted by the executive layer in response to writing the first block data into the storage buffer pool. The block data of the next block here mainly refers to the second block data of the second block (e.g., the block 2 shown in FIG. 4), and the first block processing space of the storage buffer pool continues to be subjected to buffer refreshing through the first refreshing thread to obtain a buffered refreshing result (for example, at this time, the first refreshing thread may count the next time (for example, time T2', that is, time T2' is the next time of the time T1') of the storage buffer pool), where the number of the stored block data to be stored is N+1. At this time, the block chain node may update the first space detection result by using the buffer refreshing result and then determine whether the storage buffer pool has space to process the next block at the next time (for example, time T2') based on the updated first space detection result. In response to the updated first space detection result indicating that the number of block data to be stored in the first block processing space has not reached the buffer block processing threshold, the second block data may be further added to the storage buffer pool where the first block data is located at the next time.

The second block shown in FIG. 4 may be a block 2 to be verified that is packed by the consensus layer at the time T2, and the block 2 to be verified may include K2 transaction services, specifically including a transaction 31, a transaction 32, a transaction 33, . . . , a transaction 3*n* shown in FIG. 4. An executive layer of the block chain node may, in response to acquiring the K2 transaction services, perform transaction verification on each of the K2 transaction service, and after the transaction verification is successful, obtain a transaction execution result of each transaction service. The transaction execution result of each transaction service may be a second transaction execution result shown in FIG. 4. In the second transaction execution result, a result 41 may be a transaction execution result corresponding to the transaction 31, the result 42 may be a transaction execution result corresponding to the transaction 32, the result 43 may be a transaction execution result corresponding to the transaction 33, and by analogy, the result 4*n* may be a transaction execution result corresponding to the transaction 3*n*.

The block chain node may, after completing the transaction verification of the K2 transaction services, generate verification success indication information. In this way, the consensus layer of the block chain node may, in response to receiving new verification success indication information transmitted by more than half of the other consensus nodes, determine that a block consensus on the second block has been reached, such that the second block data of the second block that has reached consensus (i.e., the block 2 shown in FIG. 4) can be written to the local cache and the local storage. Therefore, the second block data of the second block can be quickly written to the storage buffer pool when the storage buffer pool has space to process the next block upon subsequent detection.

S103: Detect a second block processing space of the storage processing pool associated with the storage buffer pool to obtain a second space detection result.

The storage processing pool is configured to store M block data to be fed back associated with a distributed database, where M is a non-negative integer and is configured to represent the number of blocks to be fed back in the second block processing space.

After performing step S103, the block chain node may collectively refer to the first merged data or the second merged data in the storage buffer pool as the data to be stored, and further detect the second block processing space of the storage processing pool associated with the storage buffer pool through a second refreshing thread to obtain the second space detection result. In response to the second space detection result indicating that the number of block data to be fed back in the second block processing space (e.g., M=10) reaches a feedback block processing threshold (e.g., $M_{max}$=10), the block chain node may notify the storage buffer pool to wait for the storage of the data to be stored until the second space detection result detected through the second refreshing thread indicates that the number of data to be fed back in the second block processing space has not reached the feedback block processing threshold. In this way, the following step S104 may be further performed when the block chain node determines that the number of data to be fed back has not reached the feedback block processing threshold of the storage processing pool according to the second space detection result.

The following step S104 may be performed directly when the block chain node completes the execution of step S103, that is, determines the number (e.g., M=7) of data to be fed back in the second block processing space as indicated by the second space detection result has not reached the feedback block processing threshold (e.g., $M_{max}$=10) after detecting the second block processing space of the storage processing pool associated with the storage buffer pool through the second refreshing thread.

S104: determine, in response to the second space detection result indicating that a number of block data to be fed back in the second block processing space does not reach a feedback block processing threshold of the second block processing space, block data to be merged in the storage buffer pool based on the number of the block data to be fed back and the feedback block processing threshold, perform overlap detection on the block data to be merged and the M block data to be fed back, and write the data retained after overlap detection into the distributed database.

Specifically, when the data to be stored in the storage buffer pool includes the N block data to be stored and the first block data, and the first block data has no data overlap with the N block data to be stored, the block chain node may, in response to the second space detection result indicating that the number of block data to be fed back in the second block processing space does not reach the feedback block processing threshold of the second block processing space, determine a number difference between the number of the block data to be fed back and the feedback block processing threshold, further determine block data to be merged from the N block data to be stored and the first block data based on the number difference and a block height of the data to be stored in the storage buffer pool, and perform overlap detection on the block data to be merged and the M block data to be fed back to obtain an overlap detection result. Further, the block chain node may, in response to the overlap detection result indicating that the M block data to be fed back has no block data to be fed back that overlaps with the block data to be merged, write the block data to be merged into the storage processing pool, further collectively refers to the block data to be merged in the storage processing pool and the M block data to be fed back as data retained after overlap detection, and write the data retained after overlap detection into the distributed database. The process of writing a plurality of blocks data into the distributed database by the block chain node is executed in parallel, which can break through the limitations of the existing block chain structure of block storage from the root, thereby improving the data storage efficiency.

In some embodiments, in the process of writing the data retained after overlap detection into the distributed database, the block chain node will continuously receive storage completion feedback information of the corresponding data in the block data returned by the distributed database. Based on this, the block chain node receiving the storage completion feedback information of the corresponding data is indirectly reflected in that data successfully written into the distributed database exists in the data retained after the overlap detection. At this time, the block chain node may refer to the block data to which the data successfully written into the distributed database belongs to target block data, and receive a data completion amount of the target block data fed back by the distributed database. Then, the block chain node may perform, based on the data completion amount, decremental processing on the amount of data to be stored corresponding to the target block data in a block storage state mapping table, till the amount of data to be stored reaches a decrement threshold (e.g., 0), and determine that a complete block corresponding to the target block data has been successfully written into the distributed database.

The M block data to be fed back stored in the storage processing pool are block data that are currently being stored in the distributed database, but have not received the stored feedback information returned by the distributed database. The data retained after the overlap detection may be a plurality of block data. In this way, the block chain node can realize the parallel storage of a plurality of blocks through the storage buffer pool and the storage processing pool. Based on this, in the process of parallel storage of the block data in the storage processing pool to the distributed database, the block chain node may receive the storage completion feedback information of the corresponding data in each block data returned by the distributed database. At this time, the block chain node may, based on the received storage completion feedback information of the corresponding data (i.e., the data completion amount of the target block data), perform decremental processing on the amount of data to be stored at a block height (i.e., a height of the block) of the block corresponding to the target block data in a block storage state mapping table in the storage layer, till the amount of data to be stored in the block height of the corresponding block reaches a decrement threshold (e.g., 0). In this case, the block chain node may determine that the complete block with the block height corresponding to the target block data has been successfully written to the distributed database.

It can be seen that, in the process of data storage in this embodiment of the present disclosure, the previous local storage is replaced with the distributed storage in order to increase the data storage capacity. In addition, in order to improve the efficiency of reading and writing data in the process of using the distributed storage for data storage, the storage layer is further expanded in this embodiment of the application. For example, the local cache, the local storage, the storage buffer pool, the storage processing pool and the like are expanded in the storage layer and reconstructed to obtain a new storage layer. In this way, the process of using this storage layer to obtain the data stored in the distributed database can not only realize parallel storage of a plurality of blocks, but also break through the limitation of a block chain structure maintained by the entire block chain system from the root. In other words, the block chain node (i.e., a consensus node participating in the consensus) in this embodiment of the present disclosure can improve the data storage capacity and the data storage efficiency in the process of storing a plurality of blocks in parallel in the distributed database.

Figure 5:
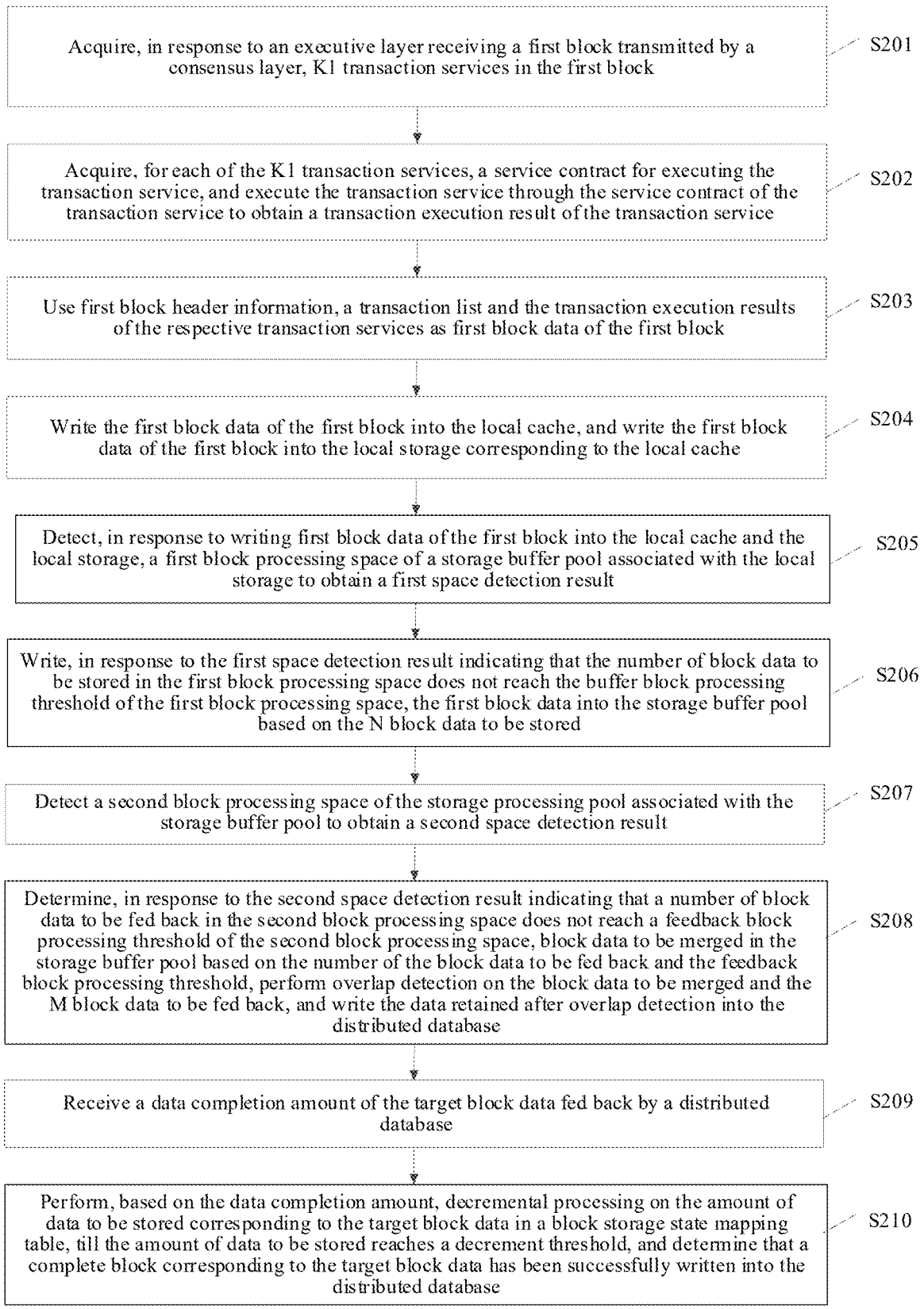
FIG. 5 is a schematic flowchart of a data processing method based on distributed storage provided by an embodiment of the present disclosure.

Further, FIG. 5 is a schematic flowchart of a data processing method based on distributed storage provided by an embodiment of the present disclosure. As shown in FIG. 5, the method may be executed by a block chain node, which may be any core node (e.g., the node 10c) in the consensus network 100a shown in FIG. 1. The method may specifically include the following steps S201-S210.

S201: Acquire, in response to the executive layer receiving a first block transmitted by a consensus layer, K1 transaction services in the first block.

The first block includes first block header information and a transaction list associated with the K1 transaction services. The K1 is a positive integer.

S202: Acquire, for each of the K1 transaction services, a service contract for executing the transaction service, and execute the transaction service through the service contract of the transaction service to obtain a transaction execution result of the transaction service.

Specifically, for each of the K1 transaction services, the block chain node may acquire, based on a contract calling address of the transaction service, a service contract for executing the transaction service. Further, the block chain node may search, through the service contract of the transaction service, target data associated with the transaction service from the local cache. The block chain node may use, in response to finding the target data associated with the transaction service from the local cache, the found target data in the local cache as target read data of the transaction service, and execute the transaction service based on the target read data of this transaction service to obtain a transaction execution result of this transaction service.

Figure 6:
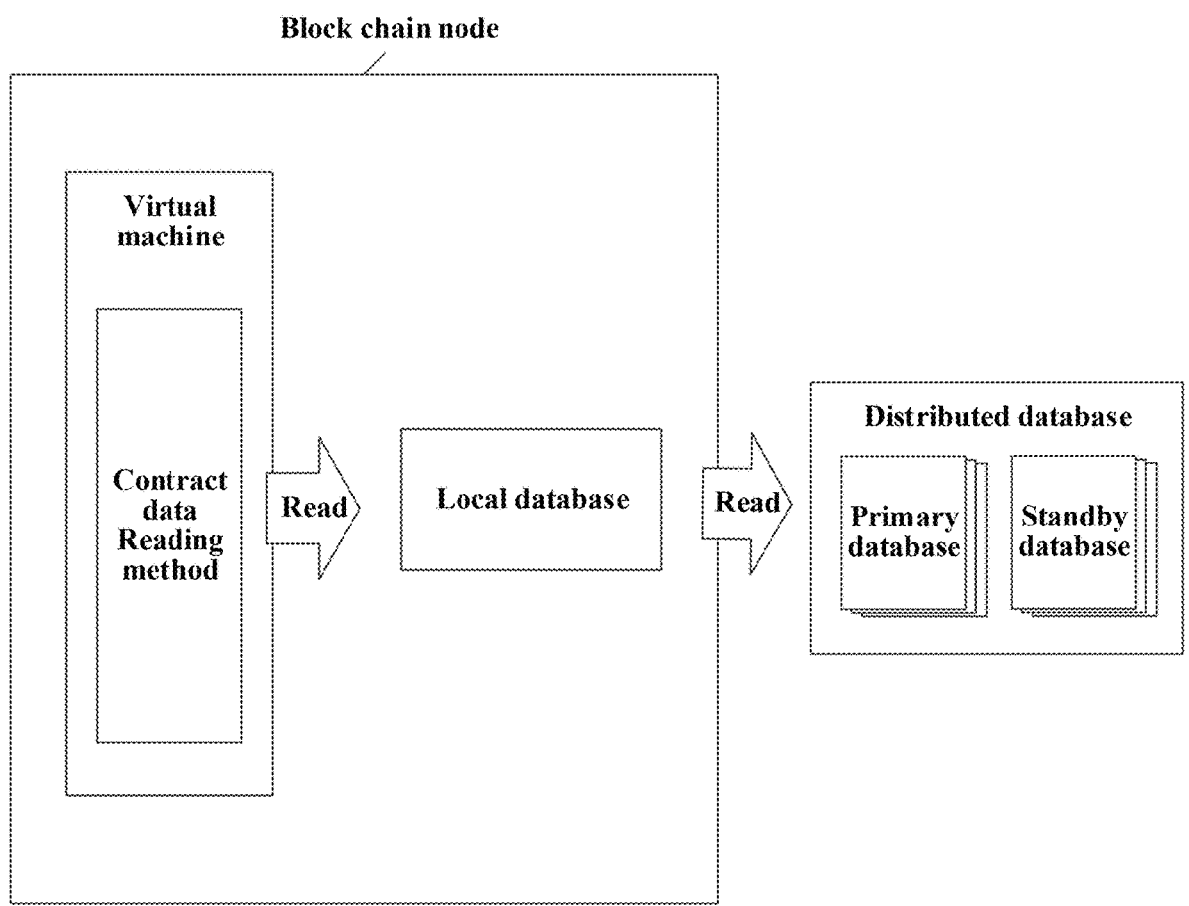
FIG. 6 is a schematic diagram of a scenario in which target data is read provided by an embodiment of the present disclosure.

For ease of understanding, further, FIG. 6 is a schematic diagram of a scenario in which target data is read provided by an embodiment of the present disclosure. The block chain node may acquire, in response to executing a certain transaction service (e.g., transaction service Tx1) in the first block, target data configured to execute this transaction service Tx1 from a local database (e.g., a database 1 corresponding to the local cache, the database 1 being a system database) as shown in FIG. 6 through a contract data reading method of a smart contract (i.e., a service contract of the transaction service Tx1) that runs on a virtual machine. The target data here may be configured adaptively according to the above-mentioned service scenarios, which is not limited here. For example, in the process of asset transfer, the target data here may be an account balance of a target user who requests the asset transfer, etc.

When the block chain node is down or a system failure occurs in the process of executing the next transaction service (e.g., transaction service Tx2) of the transaction service Tx1 in the first block, the aforementioned first block may be re-received through a data recovery thread while the node restarts, so as to continue to execute the transaction service in the first block based on data (i.e., backup data) stored in the local storage. At this time, the block chain node may also preferentially read data that needs to execute the corresponding transaction service from a local database in FIG. 6 (e.g., a database 2 corresponding to local storage, the database 2 being a hard disk database). Under normal circumstances, the system database may be regarded as a primary storage database in the node, and the hard disk database may be regarded as a standby storage database in the node. It can thus be seen that, this embodiment of the present disclosure can improve the disaster recovery capability in the event of a failure through primary-standby switching in the local database of the node during the execution of the transaction service. In addition, by using the local cache locally used in the node in this embodiment of the present disclosure, the network overhead caused by the distributed database can be effectively reduced during the transaction execution process.

It can thus be seen that, in response to finding the target data associated with each transaction service from the local cache, the block chain node can use the found target data in the local cache as the target read data of each transaction service. Further, the block chain node may execute, based on the target read data of each transaction service, the transaction service to obtain a transaction execution result of the transaction service.

In some embodiments, as shown in FIG. 6, the block chain node may also search, through the service contract, the target data associated with the transaction service from the distributed database shown in FIG. 6 in response to not finding the target data associated with the transaction service from the local cache, and further use the found target data in the distributed database as target read data of the transaction service.

In this embodiment of the present disclosure, a data reading level of the local database corresponding to the local cache is higher than a data reading level of the distributed database shown in FIG. 6. The distributed database as shown in FIG. 6 may also include a primary database and a standby database. By introducing a one-primary and multiple-standby mode into the distributed database, more storage devices can be used to support service scenarios with massive data, which can greatly enhance the availability of the distributed database while increasing the data storage capacity.

The block chain node may create a local cache in a local storage layer of the node. In this way, the created local cache may be used to cache block data of the executed block transmitted by the executive layer (e.g., the block data of the executed block may be block data of an executed block A).

Further, when the consensus layer of the block chain node submits the next block (e.g., the next block of the block A is a block B), the block B to be executed may be collectively referred to as the above-mentioned first block, and then K1 transaction services in the first block may be executed in the executive layer. For example, the executive layer may, in response to executing the first block, preferentially read the target data for executing the corresponding transaction service from the block data of the executed block cached in the local cache, further use the target data read in the local cache as target read data of the corresponding transaction service, and then execute the corresponding transaction service according to the target read data of the corresponding transaction service, so as to obtain a transaction execution result of the corresponding transaction service. In some embodiments, the executive layer of the block chain node may search, in response to not reading (i.e., hitting) target data for executing the transaction service at the current time in the local cache when executing a transaction service, target data associated with this transaction service from the distributed database through a network, and then use the found target data in the distributed database as the target read data of this transaction service.

Then, the storage layer of the block chain node may refer to block header information (i.e., first block header information) of the first block, the transaction list of the first block and the transaction execution result of each transaction service in the first block, which are transmitted by the executive layer, collectively as first block data of the first block, and then the first block data of the first block is further used as the block data of the block currently executed by the executive layer. Then, the storage layer of the block chain node may further write the block data of the currently executed block (i.e., the first block data of the first block) to the local cache and the local storage.

Figure 7:
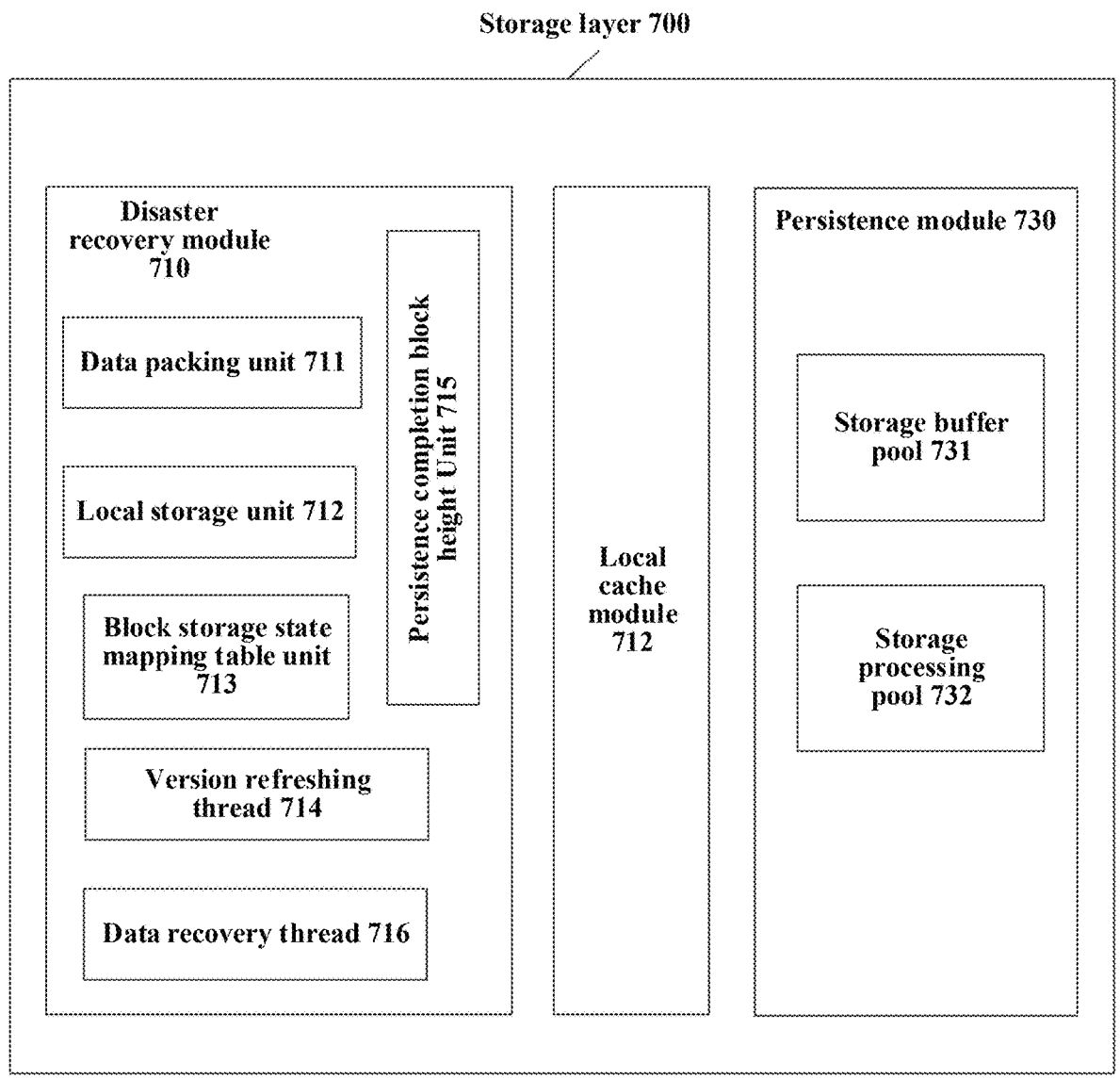
FIG. 7 is a schematic diagram of a scenario of a storage layer provided by an embodiment of the present disclosure.

For ease of understanding, further, FIG. 7 is a schematic diagram of a scenario of a storage layer provided by an embodiment of the present disclosure. A storage layer 700 shown in FIG. 7 may be the storage layer 300 in the embodiment corresponding to FIG. 2. In the implementation of replacing the local storage in the related art with a distributed database, in order to solve the problem of poor read and write efficiency in the distributed storage, this embodiment of the present disclosure proposes to create a plurality of modules in the storage layer 700 shown in FIG. 7. The plurality of modules here may specifically include a disaster recovery module 710, a local cache module 720, and a persistence module 730 shown in FIG. 7. The disaster recovery module 710 may have the same function as the disaster recovery module 310 in the embodiment corresponding to FIG. 2; the local cache module 720 may have the same function as the local cache module 320 in the embodiment corresponding to FIG. 2; and the persistence module 730 may have the same function as the persistence module 330 in the embodiment corresponding to FIG. 2.

The disaster recovery module 710 may specifically include a data packing unit 711, a local storage unit 712, a block storage state mapping table unit 713, a version refreshing thread 714, a data recovery thread 716 and a persistence completion block height unit 715 as shown in FIG. 7.

A disaster recovery processing flow of the disaster recovery module 710 may be described as follows:

the data packing unit 711 may serialize all data to be stored (i.e., n1 data) in the current block (i.e., the above-mentioned first block) into one data (e.g., the currently serialized data may be data V1), and then, by taking a block height (e.g., H1) of the current block (i.e., the first block) as a key in a KV key-value pair and a processing result (i.e., the serialized data) of the current block by the data packing unit 731 as a Value, store the KV key-value pair (i.e., block height of the current block, currently serialized data) into the local storage unit 712 shown in FIG. 7. For example, (block height of the current block, currently serialized data)=(H1, V1). In this embodiment of the present disclosure, all the n1 data to be stored in the current block (i.e., the above-mentioned first block) may be collectively referred to as an amount of data to be stored in the first block having a block height being H1. For example, the n1 data may include, but is not limited to, the transaction execution results of the K1 transaction services.

The block storage state mapping table unit 713 may be configured to store the amount of data to be stored in the corresponding block, and may also be configured to indicate that the block chain node has completed the distributed storage of this block when the amount of data to be stored in the corresponding block is 0. For example, when the storage processing pool (e.g., the storage processing pool 732 shown in FIG. 7) has block data (i.e., the target block data) to which the data successfully written into the distributed database belongs in the data retained after the overlap detection, the data storage capacity corresponding to the target block data can be decremented in a storage state mapping table stored in the block storage state mapping table unit 713, so as to update the amount of data to be stored in the storage state mapping table in real time.

The persistence completion block height unit 715 may be configured to store block data of continuous and complete blocks in the current distributed database. For example, when the blocks that have been stored in the distributed database include: block 0-block 100, a block 111, a block 112, and a block 113. the persistence completion block height unit 715 may be configured to store the block 100 (at this time, a block height of the block 100 may be H). Since the data from the block 100 to the block 111 is not continuous, the persistence completion block height unit 715 may periodically query whether a block height H+1 in the block storage state mapping table maintained by the block storage state mapping table unit 713 shown in FIG. 7 has been stored. If the storage has been completed, the persistence completion block height unit 715 may update the persistence completion block height maintained by itself to H=H+1 (that is, at this time, a new H may be 100+1=101). In addition, the block chain node will call the version refresh threading 714 shown in FIG. 7 to store the block height H (e.g., the block height of the previously stored block 100) into the distributed database.

The version refreshing thread 714 here may store the block height H in the persistence completion block height unit 715 shown in FIG. 7 into the above-mentioned distributed database. The reason why the block height H needs to be stored in the distributed database is that the local node is likely to damage, such as system failure, or hard disk damage. Therefore, when the block chain node is used subsequently, data in a block corresponding to the corresponding block height can be acquired from other consensus nodes for completion.

The data recovery thread 716 may compare the latest block height in the local storage unit 712 shown in FIG. 7 with the latest block height in the distributed database (i.e., the block height stored by the version refreshing thread) as the node restarts. If it is found that a remotely distributed database has block missing (that is, the block heights are inconsistent, for example, the latest block height of the local storage unit 712 is higher than the latest block height in the distributed database), the block chain node can acquire the missing block height data from the local storage unit shown in FIG. 7, and rewrite the missing block height data to the distributed database in an order of block height from high to low. In this way, after the data recovery is completed, the corresponding data in the local storage unit 712 shown in FIG. 7 can be deleted to prevent excessive consumption of a local storage space corresponding to the local storage unit 712.

The local storage unit 712 has the same function as the local storage 312 in the above-mentioned embodiment shown in FIG. 2. For example, the local storage unit 712 may be configured to store complete disaster recovery data (i.e., to store complete backup data). Specifically, the disaster recovery data in the local storage unit 712 may be the block data of the current executed block transmitted by the executive layer.

Figure 8:
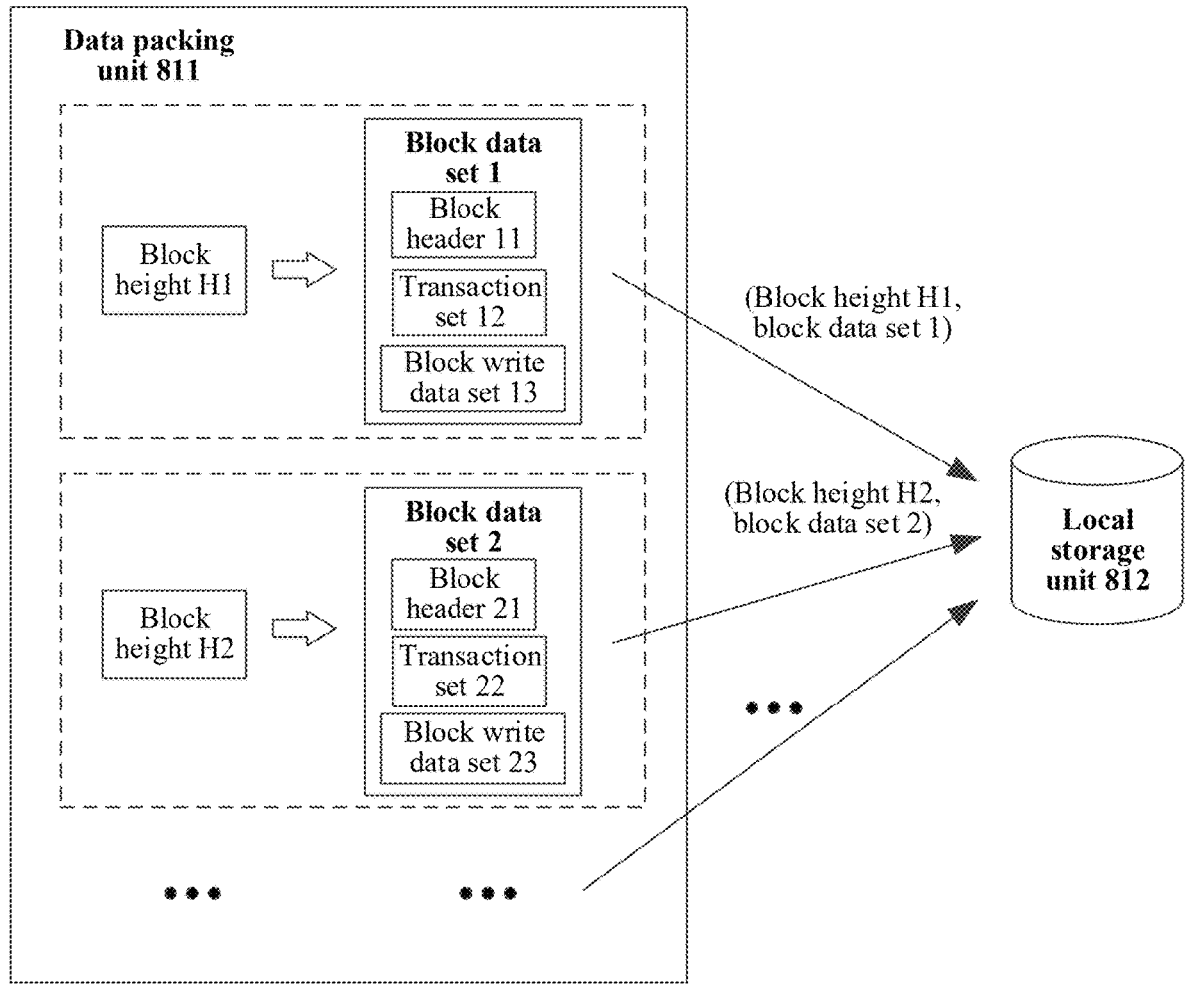
FIG. 8 is a schematic diagram of a scenario of a data packing unit provided by an embodiment of the present disclosure.

For ease of understanding, further, FIG. 8 is a schematic diagram of a scenario of a data packing unit provided by an embodiment of the present disclosure. A data packing unit 811 shown in FIG. 8 may be the data packing unit 711 for performing data packing in the embodiment shown in FIG. 7.

When the current block executed by the executive layer is a block 1 corresponding to the block height H1 shown in FIG. 8, the block 1 may be referred to as a first block. In this case, as shown in FIG. 8, after the executive layer executes the block 1, the data packing unit 811 may serialize all data to be stored (e.g., a block header 11, a transaction set 12 and a block write data set 13 shown in FIG. 8) in the current block (i.e., the above-mentioned first block) into one data (e.g., the currently serialized data may be a block data set 1 shown in FIG. 8), and then, by taking a block height (e.g., a block height H1 shown in FIG. 8) of the current block (i.e., the first block) as a key in a KV key-value pair and a processing result (i.e., the serialized block data set 1) of the current block by the data packing unit 831 as a Value, store the KV key-value pair (i.e., the block height of the current block, the currently serialized data) into a local storage unit 812 shown in FIG. 8. For example, in this case, (the block height of the current block, the currently serialized data)= (block height H1, block data set 1). all the n1 data to be stored in the current block (i.e., the first block) may specifically include a block header 11, a transaction set 12 and a block write data set 13 shown in FIG. 8.

By analogy, as shown in FIG. 8, when the current block executed by the executive layer is a block 2 corresponding to a block height H2 shown in FIG. 8, the block 2 may be referred to as a new first block. The new first block may be a second block. In this case, as shown in FIG. 8, after the executive layer executes the block 2 shown in FIG. 8, the data packing unit 811 may serialize all data to be stored (e.g., a block header 21, a transaction set 22 and a block write data set 23 shown in FIG. 8) in the current block (i.e., the new first block) into one data (e.g., the currently serialized data may be a block data set 2 shown in FIG. 8), and then, by taking a block height (e.g., a block height H2 shown in FIG. 8) of the current block (i.e., the new first block) as a key in a KV key-value pair and a processing result (i.e., the serialized block data set 2) of the current block by the data packing unit 831 as a Value, store the KV key-value pair (i.e., the block height of the current block, the currently serialized data) into the local storage unit 812 shown in FIG. 8. For example, in this case, (the block height of the current block, the currently serialized data)=(block height H2, block data set 2). All the n1 data to be stored in the current block (i.e., the new first block) may specifically include a block header 21, a transaction set 22 and a block write data set 23 shown in FIG. 8.

It can thus be seen that the data packing unit 811 may be responsible for packing all the data of each block into one block data set, and then, by taking the block height (i.e., a height of the block) as a key and a block data set as a value, store them into the local storage unit 812 shown in FIG. 8. In this way, when the system is down and restarted, the block chain node can compare the latest block height stored in the local storage unit 812 shown in FIG. 8 with the latest block height stored in the distributed database, so as to complete data of the block corresponding to the corresponding block height that is lacking in a remote distributed database. The block chain node may acquire the latest block height of the distributed database from the above-mentioned distributed database through a getLastBlockHeigh interface (i.e., a general block chain interface).

The reason why the block chain node needs to write the first block data of the first block to the local storage is that the local cache here is a storage unit in a system memory of the block chain node, while this local storage may be a storage unit in a storage hard disk of the block chain node. When the block chain node is down or restarts due to a system failure, the content stored in the local cache will not disappear, and there is no way to read target data directly based on the restarted local cache. Therefore, by introducing the disaster recovery module, when the block chain node fails, primary-standby switching in the node can be intelligently realized; and then in the process of reading the target data, the disaster recovery capability can be improved through a backup local storage, so that the block data of the currently executed block can be quickly and accurately written to the distributed database after the first block is executed subsequently.

S203: Use the first block header information, the transaction list, and the transaction execution results of the respective transaction services as first block data of the first block.

S204: Write the first block data of the first block into the local cache, and write the first block data of the first block into the local storage corresponding to the local cache.

The following step S205 may be executed after the block chain node executes step S204. In addition, the block chain node may further notify the executive layer to execute K2 transaction services in a second block in response to writing the first block data into the local cache and the local storage. The second block may be obtained by packing the K2 transaction services by a consensus layer. The K2 here may be a positive integer. The second block here is the next block of the aforementioned first block.

It can be seen that the block chain node in the embodiments of the present disclosure can support read-write separation, so that an access pressure on the database (herein referred to as the distributed database) can be reduced. That is, the block chain node, after executing the first block, may write the first block data of the first block into the distributed database on the one hand, and on the other hand, search (i.e., read) the target data associated with each of the K2 transaction services from the local cache while executing the second block, thereby greatly advancing the processing time of the next block and increasing the throughput of a block chain maintained by the block chain node.

The specific implementation of steps S201 to S204 may refer to the description of the specific process of writing the first block data to the local cache and the local storage in the embodiment shown in FIG. 3, which will not be repeated here.

S205: Detect, in response to writing first block data of a first block into a local cache and a local storage, a first block processing space of a storage buffer pool associated with the local cache to obtain a first space detection result.

The storage buffer pool includes N block data to be stored, where N is a non-negative integer and is configured to represent the number of blocks to be stored in the first block processing space.

Before the block chain node writes the first block data into the storage buffer pool, whether the storage buffer pool has space to process the next block needs to be determined through the first refreshing thread. That is, the block chain node can determine whether the number of blocks to be stored in the first block processing space of the storage buffer pool reaches a buffer block processing threshold by using the first refreshing thread. When the block chain node determines that the number of blocks to be stored has reached the buffer block processing threshold, the block chain node can notify the executive layer to wait for the first block of data to be stored. On the contrary, when the block chain node determines that the number of blocks to be stored has not reached the buffer block processing threshold, the block chain node may further execute the following step S206.

S206: Write, in response to the first space detection result indicating that the number of block data to be stored in the first block processing space does not reach the buffer block processing threshold of the first block processing space, the first block data into the storage buffer pool based on the N block data to be stored.

Specifically, the block chain node may further acquire, in response to determining a first space detection result indicating that the number of block data to be stored in the first block processing space has not reached the buffer block processing threshold of the first block processing space, N block data to be stored from the storage buffer pool after executing step S205, and then search block data to be stored that overlaps with the first block data from the N block data to be stored. Further, in response to finding the block data to be stored that overlaps with the first block data from the N block data to be stored, the block chain node may use the found block data to be stored as overlapped block data. Further, the block chain node may replace the overlapped block data with the first block data in the N block data to be stored, use the replaced N block data to be stored as first merged data associated with the first block data, and write the first merged data into the storage buffer pool. The block chain node may use, in response to not finding the block data to be stored that overlaps with the first block data from the N block data to be stored, the first block data and the N block data to be stored as second merged data associated with the first block data, write the second merged data into the storage buffer pool, and perform incremental processing on the number of block data to be stored in the first block processing space in the storage buffer pool. The number of block data to be stored in the first block processing space after incremental processing is N+1.

It can thus be seen that, in this embodiment of the present disclosure, the block chain node needs to perform merge processing in the process of writing the first block data into the storage buffer pool, that is, needs to determine whether the first block data has data overlap with the N block data to be stored in the storage buffer pool. In the presence of data overlap, data needs to be merged. That is, the block data to be stored with data overlap in the N block data to be stored may be replaced with the first block data, and then, the first merged data may be written into the storage buffer pool, thereby avoiding the phenomenon of wasting storage space due to repeated storage of the same data (i.e., two data having data overlap) in the subsequent distributed database. In the absence of data overlap, the first block data and the N block data to be stored may be merged, so as to write the merged second merged data into the storage buffer pool. In this embodiment of the present disclosure, the repeated block data is merged by using a merge processing method, which can reduce the amount of data writing.

In some embodiments, after the execution of step S206 by the block chain node, that is, when writing the first block data into the storage buffer pool, the block chain node may also receive second block data of the second block transmitted by the executive layer. The second block data is obtained by the executive layer in response to executing the K2 transaction services. Further, the block chain node may perform, through the first refreshing thread, buffer refreshing on the first block processing space of the storage buffer pool to obtain a buffer refreshing result, and update the first space detection result by using the buffer refreshing result. Further, the block chain node may add, in response to the updated first space detection result indicating that the number of block data to be stored in the first block processing space does not reach a buffer block processing threshold of the storage buffer pool, the second block data to the storage buffer pool where the first block data is located.

In this embodiment of the present disclosure, the block can be prevented from executing too fast as much as possible by introducing the storage buffer pool in the persistence module of the storage layer. That is, the storage buffer pool in this storage layer may be configured to notify the local cache to eliminate some data that has been cached for a long time after the data is successfully stored in the distributed database. In this way, the problem that the local cache eliminates data that has not been stored in the distributed database due to the fast execution of the block can be solved fundamentally, thereby avoiding the phenomenon that the data read by the executive layer is erroneous.

S207: Detect a second block processing space of the storage processing pool associated with the storage buffer pool to obtain a second space detection result.

The storage processing pool is configured to store M block data to be fed back associated with a distributed database, where M is a non-negative integer and is configured to represent the number of blocks to be fed back in the second block processing space.

In this embodiment of the present disclosure, in the process of performing the above steps S205-S206, the block chain node may also perform steps S207-S208 asynchronously. For example, in the process of writing the first block data to the storage buffer pool, the block chain node can asynchronously perform space detection on the second block processing space of the storage processing pool to obtain a second space detection result.

When the second space detection result indicates that the number of block data to be fed back in the second block processing space reaches a feedback block processing threshold of the second block processing space, it is determined that the storage processing pool currently has no space to hold data. At this time, in order to prevent writing too much data to the storage processing pool at one time, the block chain node needs to notify the storage buffer pool to store and wait for the data to be stored. That is, the block chain node does not need to instruct the storage processing pool to acquire the block data to be merged from the storage buffer pool.

On the contrary, when the second space detection result indicates that the number of block data to be fed back in the second block processing space has not reached a feedback block processing threshold of the second block processing space, it is determined that the storage processing pool currently has space to hold data. At this time, the block chain node may execute the following step S208 to acquire the block data to be merged from the storage buffer pool.

S208: Determine, in response to the second space detection result indicating that a number of block data to be fed back in the second block processing space does not reach a feedback block processing threshold of the second block processing space, block data to be merged in the storage buffer pool based on the number of the block data to be fed back and the feedback block processing threshold, perform overlap detection on the block data to be merged and the M block data to be fed back, and write the data retained after overlap detection into the distributed database.

Specifically, the data in the storage buffer pool includes N block data to be stored and the first block data; and the block chain node may determine, in response to the second space detection result indicating that the number of block data to be fed back in the second block processing space does not reach the feedback block processing threshold of the second block processing space, a number difference between the number of the block data to be fed back in the second block processing space and the feedback block processing threshold when the first block data has no data overlap with the N block data to be stored, further determine block data to be merged from the N block data to be stored and the first block data based on the number difference and a block height of the data to be stored in the storage buffer pool, and perform overlap detection on the block data to be merged and the M block data to be fed back to obtain an overlap detection result. In this case, the block chain node may write, in response to determining the overlap detection result indicating that the M block data to be fed back has no block data to be fed back that overlaps with the block data to be merged, the block data to be merged into the storage processing pool, then use the block data to be merged in the storage processing pool and the M block data to be fed back as data retained after overlap detection, and write the data retained after overlap detection into the distributed database. In response to determining the overlap detection result indicating that the M block data to be fed back has no block data to be fed back that overlaps with the block data to be merged, the block chain node needs to overwrite the block data to be fed back, that has an overlap with the data to be merged acquired from the storage buffer pool, with the data to be merged, so as to prevent multiple writing of repeated data.

S209: Receive a data completion amount of the target block data fed back by the distributed database.

The target block data is block data to which data successfully written into the distributed database belongs in the data retained after the overlap detection.

S210: Perform, based on the data completion amount, decremental processing on the amount of data to be stored corresponding to the target block data in a block storage state mapping table, till the amount of data to be stored reaches a decrement threshold, and determining that a complete block corresponding to the target block data has been successfully written into the distributed database.

The specific implementation of steps S205 to S210 may refer to the description of the specific process of storing a plurality of block data into the distributed database in the embodiment shown in FIG. 3, which will not be repeated here.

Figure 9:
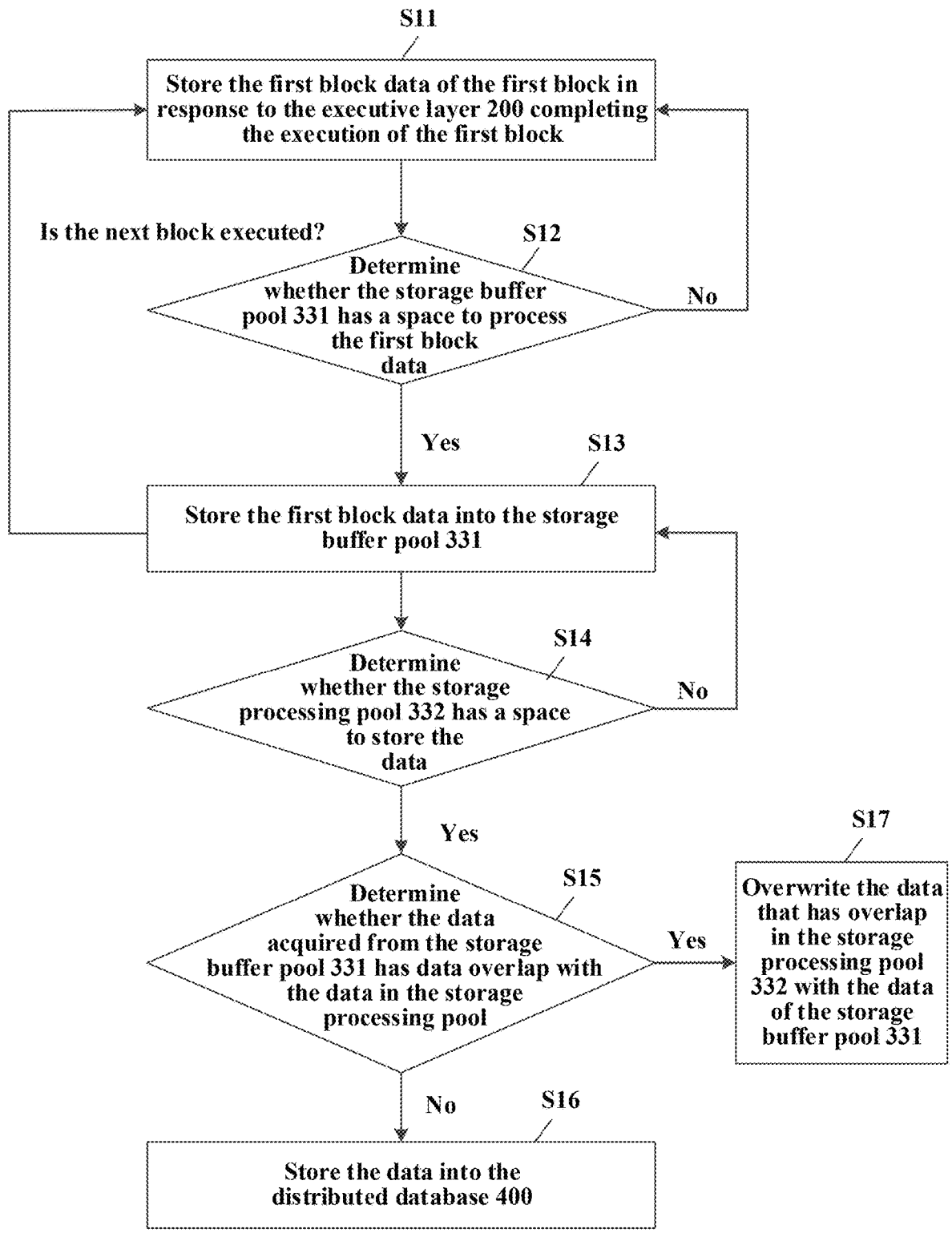
FIG. 9 is a data interaction diagram provided by an embodiment of the present disclosure.

For ease of understanding, further, FIG. 9 is a data interaction diagram provided by an embodiment of the present disclosure. An executive layer 200 shown in FIG. 9 may be the executive layer 200 in the embodiment corresponding to FIG. 2. When the block chain node executes a step S11 shown in FIG. 9, the storage layer in the block chain node may receive the first block data transmitted by the executive layer 200 after the first block is executed, and then store the received first block data to the local storage and the local cache in this storage layer. The block chain node, after storing the first block data to the local storage and the local cache, may further perform a step S12 shown in FIG. 9 to determine whether the storage buffer pool 331 has space to process block data of the current block (i.e., the first block data); and if so, a step S13 shown in FIG. 9 may be further performed. On the contrary, it jumps to execute step S11 shown in FIG. 9. That is, the block chain node needs to wait for the storage buffer pool to have space to process the first block data, and then write the first block data to the storage buffer pool 331 shown in FIG. 9. Further, as shown in FIG. 9, in the process of performing the above steps S12 and S13, the block chain node may also asynchronously perform steps S14 and S15 shown in FIG. 9. That is, the block chain node may asynchronously detect whether the storage processing pool 332 shown in FIG. 9 has space to save data; and if so, perform overlap detection on the data acquired from the storage buffer pool 331 (i.e., the above-mentioned block data to be merged) and the M block data to be fed back currently stored in the storage processing pool to obtain the above-mentioned overlap detection result. The block chain node may write, in response to determining, based on the overlap detection result, that the M block data to be fed back has no block data to be fed back that overlaps with the block data to be merged, the block data to be merged into the storage processing pool, and then use the block data to be merged in the storage processing pool and the M block data to be fed back as data retained after overlap detection, for executing a step S16 shown in FIG. 9. On the contrary, the block chain node can perform a step S17 shown in FIG. 9. For example, the block chain node, in response to determining, based on the overlap detection result, that the M block data to be fed back has block data to be fed back that overlaps with the block data to be merged, may overwrite the data (i.e., old data) in the storage processing pool 332 with the data (i.e., new data) acquired from the storage buffer pool 331, thereby limiting the number of data writing, and further ensuring the accuracy of the subsequent transaction execution results of the block.

It can thus be seen that, in this embodiment of the present disclosure, parallel storage can be achieved in the storage processing pool by using the distributed storage, which can effectively break through the block chain structure during block storage, thereby greatly improving the data storage efficiency while increasing the data storage capacity. In addition, in the process of executing the transaction service in the block by the executive layer, an access pressure to the distributed database can be effectively reduced by using the local cache, and then the network overhead caused by the use of the distributed database can be reduced under certain circumstances. Furthermore, by performing primary/standby switching in the storage layer, the disaster recovery capability of the block chain node can be effectively improved when the node fails.

Figure 10:
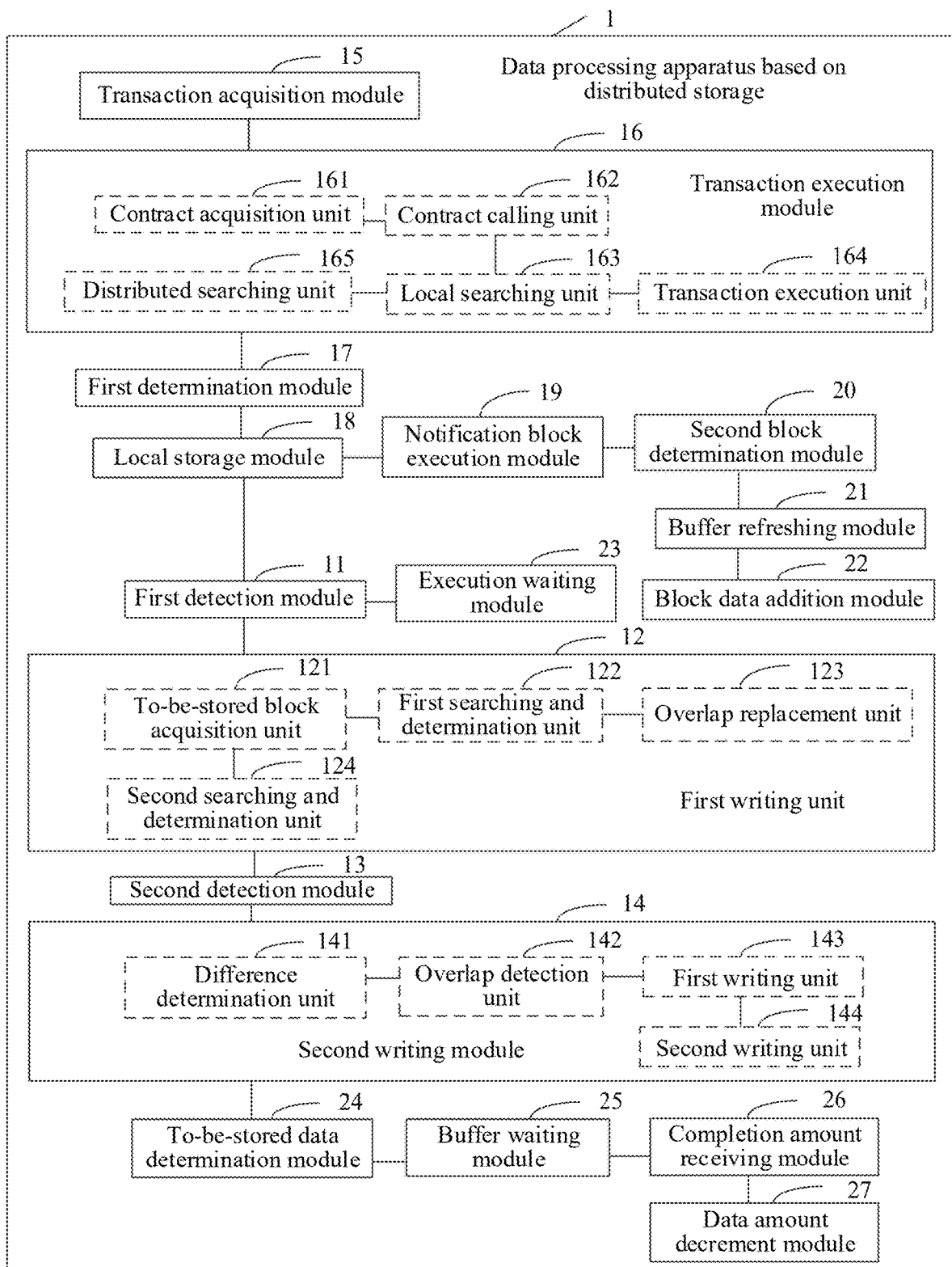
FIG. 10 is a schematic flowchart of a data processing apparatus based on distributed storage provided by the present disclosure.

Further, FIG. 10 is a schematic flowchart of a data processing apparatus based on distributed storage provided by the present disclosure. As shown in FIG. 10, the data processing apparatus 1 based on distributed storage may be applied to any block chain node in the above consensus network. For example, the data processing apparatus 1 based on distributed storage may be applied to the node 10*c* in the embodiment shown in FIG. 1. The data processing apparatus 1 based on distributed storage may be a computer program (including a program code) running in a block chain node (e.g., the aforementioned node 10*c*). For example, the data processing apparatus 1 based on distributed storage may be application software. The data processing apparatus 1 based on distributed storage may be configured to execute corresponding steps in the methods provided in the embodiments of the present disclosure. As shown in FIG. 10, the data processing apparatus 1 based on distributed storage may include: a first detection module 11, a first writing module 12, a second detection module 13 and a second writing module 14. In some embodiments, the data processing apparatus 1 based on distributed storage may further include: a transaction acquisition module 15, a transaction execution module 16, a first block determination module 17, a local storage module 18, a notification block execution module 19, a second block determination module 20, a buffer refreshing module 21, a block data addition module 22, an execution waiting module 23, a to-be-stored data determination module 24, a buffer waiting module 25, a completion amount receiving module 26 and a data amount decrement module 27.

The first detection module 11 is configured to detect, in response to writing first block data of a first block into a local cache and a local storage, a first block processing space of a storage buffer pool associated with the local cache to obtain a first space detection result, the storage buffer pool including N block data to be stored, where N is a non-negative integer.

The first writing module 12 is configured to write, in response to the first space detection result indicating that a number of block data to be stored in the first block processing space does not reach a buffer block processing threshold of the first block processing space, the first block data into the storage buffer pool based on the N block data to be stored.

The first writing module 12 includes: a to-be-stored block acquisition unit 121, a first searching and determination unit 122, an overlap replacement unit 123 and a second searching and determination unit 124.

The to-be-stored block acquisition unit 121 is configured to acquire, in response to the first space detection result indicating that a number of block data to be stored in a first block processing space does not reach a buffer block processing threshold of the first block processing space, N block data to be stored from the storage buffer pool, and search block data to be stored that has data overlap with the first block data.

The first searching and determination unit 122 is configured to use, in response to finding the block data to be stored that has data overlap with the first block data from the N block data to be stored, the found block data to be stored as overlapped block data.

The overlap replacement unit 123 is configured to replace the overlapped block data with the first block data, use the replaced N block data to be stored as first merged data associated with the first block data, and write the first merged data into the storage buffer pool.

In some embodiments, the second searching and determination unit 124 is configured to use, in response to not finding the block data to be stored that has data overlap with the first block data from the N block data to be stored, the first block data and the N block data to be stored as second merged data associated with the first block data, write the second merged data into the storage buffer pool, and perform incremental processing on the number of block data to be stored in the first block processing space.

The specific implementations of the to-be-stored block acquisition unit 121, the first searching and determination unit 122, the overlap replacement unit 123 and the second searching and determination unit 124 may refer to the description of step S102 in the embodiment shown in FIG. 3, which will not be repeated here.

The second detection module 13 is configured to detect a second block processing space of a storage processing pool associated with the storage buffer pool to obtain a second space detection result. The storage processing pool is configured to store M block data to be fed back associated with a distributed database, where M is a non-negative integer.

The second writing module 14 is configured to determine, in response to the second space detection result indicating that a number of block data to be fed back in the second block processing space does not reach a feedback block processing threshold of the second block processing space, block data to be merged in the storage buffer pool based on the number of the block data to be fed back and the feedback block processing threshold, perform overlap detection on the block data to be merged and the M block data to be fed back, and write the data retained after overlap detection into the distributed database.

The data to be stored in the storage buffer pool includes the N block data to be stored and the first block data, and the first block data has no data overlap with the N block data to be stored.

The second writing module 14 includes: a difference determination unit 141, an overlap detection unit 142, a first writing unit 143 and a second writing unit 144.

The difference determination unit 141 is configured to, in response to the second space detection result indicating that the number of blocks to be fed back does not reach a feedback block processing threshold of the second block processing space, determine a number difference between the number of block data to be fed back and the feedback block processing threshold.

The overlap detection unit 142 is configured to determine the block data to be merged from the N block data to be stored and the first block data based on the number difference and a block height of the data to be stored in the storage buffer pool, and perform overlap detection on the data to be merged and the M block data to be fed back to obtain an overlap detection result.

The first writing unit 143 is configured to writing the block data to be merged into the storage processing pool in response to the overlap detection result indicating that the M block data to be fed back has no data to be fed back that overlaps with the block data to be merged.

The second writing unit 144 is configured to use the block data to be merged and the M block data to be fed back in the storage processing pool as data retained after overlap detection, and write the data retained after overlap detection into the distributed database.

The specific implementations of the difference determination unit 141, the overlap detection unit 142, the first writing unit 143 and the second writing unit 144 may refer to the description of step S104 in the embodiment shown in FIG. 3, which will not be repeated here.

In some embodiments, the transaction acquisition module 15 is configured to acquire K1 transaction services in the first block when an executive layer receives the first block transmitted by a consensus layer. The first block includes first block header information and a transaction list associated with the K1 transaction services, where the K1 is a positive integer.

The transaction execution module 16 is configured to acquire, for each of the K1 transaction services, a service contract for executing the transaction service, and execute the transaction service through the service contract of the transaction service to obtain a transaction execution result of the transaction service.

The transaction execution module 16 includes: A contract acquisition unit 161, a contract calling unit 162, a local searching unit 163, a transaction execution unit 164 and a distributed searching unit 165.

The contract acquisition unit 161 is configured to acquire, based on a contract calling address of the transaction service, a service contract for executing the transaction service.

The contract calling unit 162 is configured to search, through the service contract of the transaction service, target data associated with the transaction service from the local cache.

The local searching unit 163 is configured to use the target data found from the local cache as target read data of the transaction service in response to finding the target data associated with the transaction service from the local cache.

The transaction execution unit 164 is configured to execute, based on the target read data of the transaction service, the transaction service to obtain a transaction execution result of the transaction service.

In some embodiments, the distributed searching unit 165 is configured to search, through the service contract, the target data associated with the transaction service from the distributed database in response to not finding the target data associated with the transaction service from the local cache, and use the target data found from the distributed database as the target read data of the transaction service.

The specific implementations of the contract acquisition unit 161, the contract calling unit 162, the local searching unit 163, the transaction execution unit 164 and the distributed searching unit 165 may refer to the description of each transaction service in the embodiment shown in FIG. 3, which will not be repeated here.

The first block determination module 17 is configured to use the first block header information, the transaction list, and the respective transaction execution results of the K1 transaction services as first block data of the first block.

The local storage module 18 is configured to write the first block data of the first block into the local cache, and write the first block data of the first block into the local storage corresponding to the local cache.

In some embodiments, the notification block execution module 19 is configured to notify the executive layer to execute K2 transaction services in a second block in response to writing the first block data into the local cache and the local storage. The second block is the next block of the first block, and the second block is obtained by packaging the K2 transaction services by a consensus layer, where the K2 is a positive integer.

The second block determination module 20 is configured to receive second block data of the second block transmitted by the executive layer in response to writing the first block data into the storage buffer pool. The second block data is obtained by the executive layer in response to executing the K2 transaction services.

The buffer refreshing module 21 is configured to perform, through a first refreshing thread, buffer refreshing on the first block processing space of the storage buffer pool to obtain a buffer refreshing result, and update the first space detection result by using the buffer refreshing result.

The block data addition module 22 is configured to write, in response to the updated first space detection result indicating that the number of block data to be stored in the first block processing space does not reach the buffer block processing threshold, the second block data into the storage buffer pool based on the block data to be stored in the first block processing space.

In some embodiments, the execution waiting module 23 is configured to, prior to writing the first block data into the storage buffer pool, notify the executive layer to wait for the first block data to be stored in response to the first space detection result indicating that the number of block data to be stored in the first block processing space has reached the buffer block processing threshold.

In some embodiments, the to-be-stored data determination module 24 is configured to use the merged data in the storage buffer pool as data to be stored.

The buffer waiting module 25 is configured to notify the storage buffer pool to wait for the storage of the data to be stored in response to the second space detection result indicating that a number of block data to be fed back in the second block processing space has reached a feedback block processing threshold.

In some embodiments, the completion amount receiving module 26 is configured to receive a data completion amount of the target block data fed back by the distributed database. The target block data is block data to which data successfully written into the distributed database belongs in the data retained after the overlap detection.

The data amount decrement module 27 is configured to perform, based on the data completion amount, decremental processing on the amount of data to be stored corresponding to the target block data in a block storage state mapping table, till the amount of data to be stored reaches a decrement threshold, and determine that a complete block corresponding to the target block data has been successfully written into the distributed database.

The specific implementations of the first detection module 11, the first writing module 12, the second detection module 13 and the second writing module 14 may refer to the description of steps S101-S104 in the embodiment shown in FIG. 3, which will not be repeated here. Further, the specific implementations of the transaction acquisition module 15, the transaction execution module 16, the first block determination module 17, the local storage module 18, the notification block execution module 19, the second block determination module 20, the buffer refreshing module 21, the block data addition module 22, the execution waiting module 23, the to-be-stored data determination module 24, the buffer waiting module 25, the completion amount receiving module 26 and the data amount decrement module 27 may refer to the description of steps S201-S208 in the embodiment shown in FIG. 5, which will not be repeated here. It may be understood that, the description of beneficial effects of the same method is not described herein again.

Figure 11:
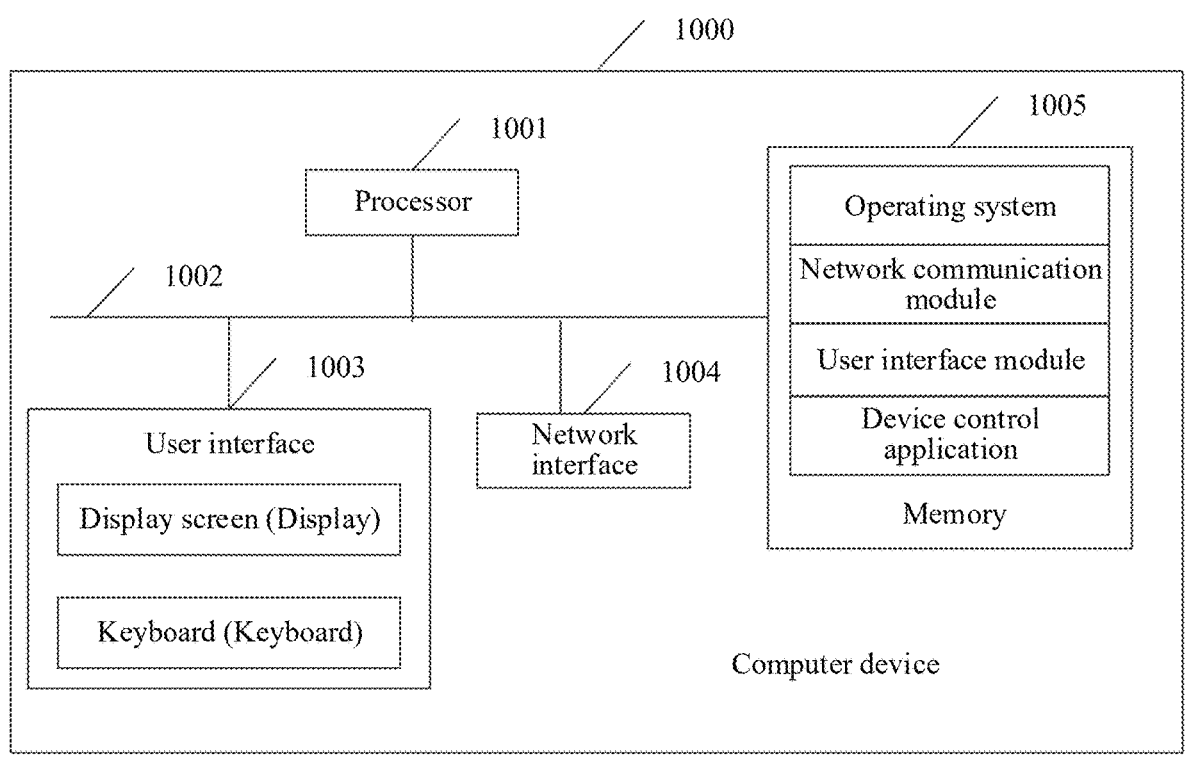
FIG. 11 is a schematic structural diagram of a computer device provided by an embodiment of the present disclosure.

Further, FIG. 11 is a schematic structural diagram of a computer device provided by an embodiment of the present disclosure. As shown in FIG. 11, the computer device 1000 may be applied to the block chain node in the above-mentioned embodiment corresponding to FIG. 1. The computer device 1000 may include: a processor 1001, a network interface 1004 and a memory 1005. In addition, the computer device 1000 may also include: a user interface 1003, and at least one communication bus 1002. The communications bus 1002 is configured to implement connection and communication between the components. The user interface 1003 may include a display, a keyboard, and in some embodiments, the user interface 1003 may further include a standard wired interface and a standard wireless interface. In some embodiments, the network interface 1004 may include a standard wired interface and a standard wireless interface (such as a Wi-Fi interface). The memory 1004 may be a high-speed random access memory (RAM), or may be a non-volatile memory, for example, at least one magnetic disk memory. In some embodiments, the memory 1005 may be at least one storage apparatus that is located far away from the foregoing processor 1001. As shown in FIG. 11, the memory 1005 used as a computer storage medium may include an operating system, a network communication module, a user interface module, and a device-control application program.

The network interface 1004 in the computer device 1000 may also provide a network communication function, and the optional user interface 1003 may also include a display screen and a keyboard. In the computer device 1000 shown in FIG. 11, the network interface 1004 may provide a network communication function; the user interface 1003 is mainly configured to provide an input interface for the user; and The processor 1001 may be configured to call a device control application program stored in the memory 1005 to realize the description of the data processing method based on distributed storage in the embodiment shown in FIG. 3 or FIG. 5, or the description of the data processing apparatus 1 based on distributed storage in the embodiment shown in FIG. 10, which will not be repeated here. In addition, the description of beneficial effects of the same method is not described herein again.

In addition, an embodiment of the present disclosure further provides a computer-readable storage medium. The computer-readable storage medium stores a computer program executed by the data processing apparatus 1 based on distributed storage mentioned above, and the computer program includes program instructions. When executing the program instruction, the processor can perform the descriptions of the data processing method based on distributed storage in the embodiment corresponding to FIG. 3 or FIG. 5. Therefore, details are not described herein again. In addition, the description of beneficial effects of the same method is not described herein again. For technical details that are not disclosed in the embodiments of the computer-readable storage medium of the present disclosure, refer to the method embodiments of the present disclosure. In an example, the program instructions may be deployed to be executed on a computing device, or deployed to be executed on a plurality of computing devices at the same location, or deployed to be executed on a plurality of computing devices that are distributed in a plurality of locations and interconnected by using a communication network, where a plurality of computing devices that are distributed in a plurality of locations and interconnected through a communication network may form a block chain system.

In addition, an embodiment of the present disclosure further provides a computer program product or a computer program. The computer program product or the computer program may include computer instructions, the computer instructions being stored in a computer-readable storage medium. In addition, the description of beneficial effects of the same method is not described herein again. For technical details that are not disclosed in the embodiments of the computer-readable storage medium of the present disclosure, refer to the method embodiments of the present disclosure.

A person of ordinary skill in the art may understand that all or some of the procedures of the methods of the foregoing embodiments may be implemented by a computer program instructing relevant hardware. The computer program may be stored in a computer readable storage medium. When the program is executed, the program may include the procedures of the embodiments of the foregoing methods. The foregoing storage medium may include a magnetic disc, an optical disc, a ROM, a RAM, or the like.

The description disclosed above is merely exemplary embodiments of the present disclosure, and certainly is not intended to limit the scope of the claims of the present disclosure. Therefore, equivalent variations made according to the claims of the present disclosure shall fall within the scope of the present disclosure.

What is claimed is:

1. A data processing method based on distributed storage, which is executed by a block chain node, and the method comprising:
    detecting, in response to writing first block data of a first block into a local cache and a local storage, a first block processing space of a storage buffer pool associated with the local cache to obtain a first space detection result, the storage buffer pool comprising N block data to be stored, N being a non-negative integer, wherein the storage buffer pool and the local cache are both included in a storage layer of the block chain node;

writing, in response to the first space detection result indicating that a number of block data to be stored in the first block processing space does not reach a buffer block processing threshold of the first block processing space, the first block data into the storage buffer pool based on the N block data to be stored;

detecting a second block processing space of a storage processing pool associated with the storage buffer pool to obtain a second space detection result, the storage processing pool being configured to store M block data to be fed back associated with a distributed database, M being a non-negative integer, wherein the M block data to be fed back in the storage processing pool are block data that are currently being stored in the distributed database, but have not received stored feedback information returned by the distributed database; and determining, in response to the second space detection result indicating that a number of block data to be fed back in the second block processing space does not reach a feedback block processing threshold of the second block processing space, block data to be merged in the storage buffer pool based on the number of the block data to be fed back and the feedback block processing threshold, performing overlap detection on the block data to be merged and the M block data to be fed back to determine data that are not overlapped as retained data, and writing the retained data into the distributed database.

2. The method according to claim 1, further comprising:
acquiring K1 transaction services in the first block when an executive layer receives the first block transmitted by a consensus layer, the first block comprising first block header information and a transaction list associated with the K1 transaction services, the K1 being a positive integer;

acquiring, for each of the K1 transaction services, a service contract for executing the transaction service, and executing the transaction service through the service contract of the transaction service to obtain a transaction execution result of the transaction service;

using the first block header information, the transaction list, and the respective transaction execution results of the K1 transaction services as first block data of the first block; and writing the first block data of the first block into the local cache, and writing the first block data of the first block into the local storage corresponding to the local cache.

3. The method according to claim 2, wherein the acquiring the service contract for executing the transaction service and executing the transaction service through the service contract of the transaction service to obtain the transaction execution result of the transaction service comprises:

acquiring, based on a contract calling address of the transaction service, a service contract for executing the transaction service;

searching, through the service contract of the transaction service, target data associated with the transaction service from the local cache;

using the target data as target read data of the transaction service in response to finding the target data associated with the transaction service from the local cache; and executing, based on the target read data of the transaction service, the transaction service to obtain a transaction execution result of the transaction service.

4. The method according to claim 3, further comprising:
searching, through the service contract, the target data associated with the transaction service from the distributed database in response to not finding the target data associated with the transaction service from the local cache, and using the target data as the target read data of the transaction service.

5. The method according to claim 2, further comprising:
notifying the executive layer to execute K2 transaction services in a second block in response to writing the first block data into the local cache and the local storage, the second block being the next block of the first block, and the second block being obtained by packaging the K2 transaction services by the consensus layer, the K2 being a positive integer.

6. The method according to claim 5, further comprising:
receiving second block data of the second block transmitted by the executive layer in response to writing the first block data into the storage buffer pool, the second block data being obtained by the executive layer in response to executing the K2 transaction services;

performing, through a first refreshing thread, buffer refreshing on the first block processing space of the storage buffer pool to obtain a buffer refreshing result, and updating the first space detection result by using the buffer refreshing result; and writing, in response to the updated first space detection result indicating that the number of block data to be stored in the first block processing space does not reach the buffer block processing threshold, the second block data into the storage buffer pool based on the block data to be stored in the first block processing space.

7. The method according to claim 1, the method further comprising:
notifying the executive layer to wait for the first block data to be stored in response to the first space detection result indicating that the number of block data to be stored in the first block processing space has reached the buffer block processing threshold.

8. The method according to claim 1, wherein the writing, based on the N block data to be stored, the first block data into the storage buffer pool comprises:

acquiring the N block data to be stored from the storage buffer pool, and searching block data to be stored that overlaps with the first block data from the N block data to be stored;

using, in response to finding the block data to be stored that overlaps with the first block data from the N block data to be stored, the found block data to be stored as overlapped block data; and replacing the overlapped block data with the first block data, using the replaced N block data to be stored as first merged data associated with the first block data, and writing the first merged data into the storage buffer pool.

9. The method according to claim 8, further comprising:
using, in response to not finding the block data to be stored that overlaps with the first block data from the N block data to be stored, the first block data and the N block data to be stored as second merged data associated with the first block data, writing the second merged data into the storage buffer pool, and performing incremental processing on the number of block data to be stored in the first block processing space.

10. The method according to claim 1, further comprising:
using the merged data in the storage buffer pool as data to be stored; and notifying the storage buffer pool to wait for the storage of the data to be stored in response to the second space detection result indicating that a number of block data to be fed back in the second block processing space has reached a feedback block processing threshold.

11. The method according to claim 1, wherein the data to be stored in the storage buffer pool comprises the N block data to be stored and the first block data, and the first block data has no data overlap with the N block data to be stored; and the determining the block data to be merged from the storage buffer pool based on the number of the block data to be fed back and the feedback block processing threshold, performing overlap detection on the block data to be merged and the M block data to be fed back to obtain data retained, and writing the data retained after the overlap detection into the distributed database comprises:

determining a difference between the number of the block data to be fed back and the feedback block processing threshold;

determining the block data to be merged from the N block data to be stored and the first block data based on the number difference and a block height of the data to be stored in the storage buffer pool; performing overlap detection on the block data to be merged and the M block data to be fed back to obtain an overlap detection result;

writing the block data to be merged into the storage processing pool in response to the overlap detection result indicating that the M block data to be fed back has no data to be fed back that overlaps with the block data to be merged; and using the block data to be merged and the M block data to be fed back in the storage processing pool as the data retained after overlap detection, and writing the data retained after the overlap detection into the distributed database.

12. The method according to claim 11, further comprising:

receiving a data completion amount of the target block data fed back by the distributed database, the target block data being block data to which data successfully written into the distributed database belongs in the data retained after the overlap detection; and performing, based on the data completion amount, decremental processing on the amount of data to be stored corresponding to the target block data in a block storage state mapping table, till the amount of data to be stored reaches a decrement threshold, and determining that a complete block corresponding to the target block data has been successfully written into the distributed database.

13. A data processing apparatus based on distributed storage, comprising:

a processor and a memory, the processor being connected to the memory, the memory being configured to store a computer program, and the processor being configured to invoke the computer program to cause the computer device to perform:

detecting, in response to writing first block data of a first block into a local cache and a local storage, a first block processing space of a storage buffer pool associated with the local cache to obtain a first space detection result, the storage buffer pool comprising N block data to be stored, N being a non-negative integer, wherein the storage buffer pool and the local cache are both included in a storage layer of the block chain node;

writing, in response to the first space detection result indicating that a number of block data to be stored in the first block processing space does not reach a buffer block processing threshold of the first block processing space, the first block data into the storage buffer pool based on the N block data to be stored;

detecting a second block processing space of a storage processing pool associated with the storage buffer pool to obtain a second space detection result, the storage processing pool being configured to store M block data to be fed back associated with a distributed database, M being a non-negative integer, wherein the M block data to be fed back in the storage processing pool are block data that are currently being stored in the distributed database, but have not received stored feedback information returned by the distributed database; and determining, in response to the second space detection result indicating that a number of block data to be fed back in the second block processing space does not reach a feedback block processing threshold of the second block processing space, block data to be merged in the storage buffer pool based on the number of the block data to be fed back and the feedback block processing threshold, performing overlap detection on the block data to be merged and the M block data to be fed back to determine data that are not overlapped as retained data, and writing the retained data into the distributed database.

14. The apparatus according to claim 13, wherein the processor is further configured to perform:

acquiring K1 transaction services in the first block when an executive layer receives the first block transmitted by a consensus layer, the first block comprising first block header information and a transaction list associated with the K1 transaction services, the K1 being a positive integer;

acquiring, for each of the K1 transaction services, a service contract for executing the transaction service, and executing the transaction service through the service contract of the transaction service to obtain a transaction execution result of the transaction service;

using the first block header information, the transaction list, and the respective transaction execution results of the K1 transaction services as first block data of the first block; and writing the first block data of the first block into the local cache, and writing the first block data of the first block into the local storage corresponding to the local cache.

15. The apparatus according to claim 14, wherein the acquiring the service contract for executing the transaction service and executing the transaction service through the service contract of the transaction service to obtain the transaction execution result of the transaction service comprises:

acquiring, based on a contract calling address of the transaction service, a service contract for executing the transaction service;

searching, through the service contract of the transaction service, target data associated with the transaction service from the local cache;

using the target data as target read data of the transaction service in response to finding the target data associated with the transaction service from the local cache; and executing, based on the target read data of the transaction service, the transaction service to obtain a transaction execution result of the transaction service.

16. The apparatus according to claim 15, wherein the processor is further configured to perform:
searching, through the service contract, the target data associated with the transaction service from the distributed database in response to not finding the target data associated with the transaction service from the local cache, and using the target data as the target read data of the transaction service.

17. The apparatus according to claim 14, wherein the processor is further configured to perform:
notifying the executive layer to execute K2 transaction services in a second block in response to writing the first block data into the local cache and the local storage, the second block being the next block of the first block, and the second block being obtained by packaging the K2 transaction services by the consensus layer, the K2 being a positive integer.

18. The apparatus according to claim 17, wherein the processor is further configured to perform:
receiving second block data of the second block transmitted by the executive layer in response to writing the first block data into the storage buffer pool, the second block data being obtained by the executive layer in response to executing the K2 transaction services;
performing, through a first refreshing thread, buffer refreshing on the first block processing space of the storage buffer pool to obtain a buffer refreshing result, and updating the first space detection result by using the buffer refreshing result; and
writing, in response to the updated first space detection result indicating that the number of block data to be stored in the first block processing space does not reach the buffer block processing threshold, the second block data into the storage buffer pool based on the block data to be stored in the first block processing space.

19. The apparatus according to claim 13, wherein the processor is further configured to perform:
notifying the executive layer to wait for the first block data to be stored in response to the first space detection result indicating that the number of block data to be stored in the first block processing space has reached the buffer block processing threshold.

20. A non-transitory computer-readable storage medium, storing a computer program, the computer program, applicable to be loaded and executed by a processor, causing a computer device comprising the processor to perform:
detecting, in response to writing first block data of a first block into a local cache and a local storage, a first block processing space of a storage buffer pool associated with the local cache to obtain a first space detection result, the storage buffer pool comprising N block data to be stored, N being a non-negative integer, wherein the storage buffer pool and the local cache are both included in a storage layer of the block chain node;
writing, in response to the first space detection result indicating that a number of block data to be stored in the first block processing space does not reach a buffer block processing threshold of the first block processing space, the first block data into the storage buffer pool based on the N block data to be stored;
detecting a second block processing space of a storage processing pool associated with the storage buffer pool to obtain a second space detection result, the storage processing pool being configured to store M block data to be fed back associated with a distributed database, M being a non-negative integer, wherein the M block data to be fed back in the storage processing pool are block data that are currently being stored in the distributed database, but have not received stored feedback information returned by the distributed database; and
determining, in response to the second space detection result indicating that a number of block data to be fed back in the second block processing space does not reach a feedback block processing threshold of the second block processing space, block data to be merged in the storage buffer pool based on the number of the block data to be fed back and the feedback block processing threshold, performing overlap detection on the block data to be merged and the M block data to be fed back to determine data that are not overlapped as retained data, and writing the retained data into the distributed database.

* * * * *